(12) United States Patent
Tanaka

(10) Patent No.: US 10,096,077 B2
(45) Date of Patent: Oct. 9, 2018

(54) INFORMATION EMBEDDING DEVICE, INFORMATION EMBEDDING METHOD, AND RECORDING MEDIUM STORING PROGRAM

(71) Applicant: FUJITSU LIMITED, Kawasaki-shi, Kanagawa (JP)

(72) Inventor: Ryuta Tanaka, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 15 days.

(21) Appl. No.: 15/254,015

(22) Filed: Sep. 1, 2016

(65) Prior Publication Data
US 2017/0061565 A1 Mar. 2, 2017

(30) Foreign Application Priority Data
Sep. 2, 2015 (JP) .................................. 2015-173040

(51) Int. Cl.
G06K 9/00 (2006.01)
G06T 1/00 (2006.01)
H04N 19/467 (2014.01)

(52) U.S. Cl.
CPC ......... *G06T 1/0028* (2013.01); *H04N 19/467* (2014.11); *G06T 2201/0051* (2013.01); *G06T 2201/0061* (2013.01); *G06T 2201/0202* (2013.01)

(58) Field of Classification Search
CPC ........... G06T 1/0028; G06T 2201/0061; G06T 2201/0052; G06T 2201/0051; H04N 2201/327
USPC ................ 382/100, 250, 238, 260; 713/176; 380/202; 375/E7.089, E7.026, E7.14, 375/E7.226, E7.232
See application file for complete search history.

(56) References Cited

U.S. PATENT DOCUMENTS

| | | | |
|---|---|---|---|
| 6,208,745 B1 * | 3/2001 | Florencio | G06T 1/0057 375/E7.026 |
| 6,654,501 B1 | 11/2003 | Acharya et al. | |
| 7,159,117 B2 * | 1/2007 | Tanaka | G06T 1/0028 375/E7.089 |

(Continued)

FOREIGN PATENT DOCUMENTS

| | | |
|---|---|---|
| EP | 1519311 A1 | 3/2005 |
| JP | 2007-036833 | 2/2007 |
| JP | 2012-142741 | 7/2012 |

OTHER PUBLICATIONS

Tseng et al.,"Prediction-based reversible data hiding", Information Sciences vol. 179, No. 14, Jun. 27, 2009, pp. 2460-2469, XP026088962, ISSN: 0020-0255, DOI: 10.1016/J.INS.2009.03.014, Amsterdam, NL.

(Continued)

*Primary Examiner* — Charlotte M Baker
(74) *Attorney, Agent, or Firm* — Fujitsu Patent Center

(57) ABSTRACT

An information embedding device, comprising: a memory; and a processor configured to execute a procedure, the procedure including: from an image, detecting, as an embedding target pixel block, a pixel block having a pixel value that, after being changed by a specific value corresponding to information to be embedded into the image, will be within a first specific range of an average value of pixel values of a surrounding pixel block; and changing the pixel value of the detected embedding target pixel block by the specific value.

18 Claims, 18 Drawing Sheets

(56) References Cited

U.S. PATENT DOCUMENTS

| | | | |
|---|---|---|---|
| 8,045,813 B2* | 10/2011 | Lee | H04N 19/82 |
| | | | 382/238 |
| 2008/0285790 A1 | 11/2008 | Au et al. | |
| 2012/0163653 A1 | 6/2012 | Anan et al. | |

OTHER PUBLICATIONS

Naskar et al.,"A Technique to Evaluate Upper Bounds on Performance of Pixel-prediction Based Reversible Watermarking Algorithms", Journal of Signal Processing Systems, vol. 82, No. 3, Jun. 12, 2015, pp. 373-389, XP035934670, ISSN: 1939-8018, DOI: 10.1007/S11265-015-1009-1, Springer, US.

EESR—The Extended European Search Report of European Patent Application No. 16185872.5 dated Jan. 31, 2017.

* cited by examiner

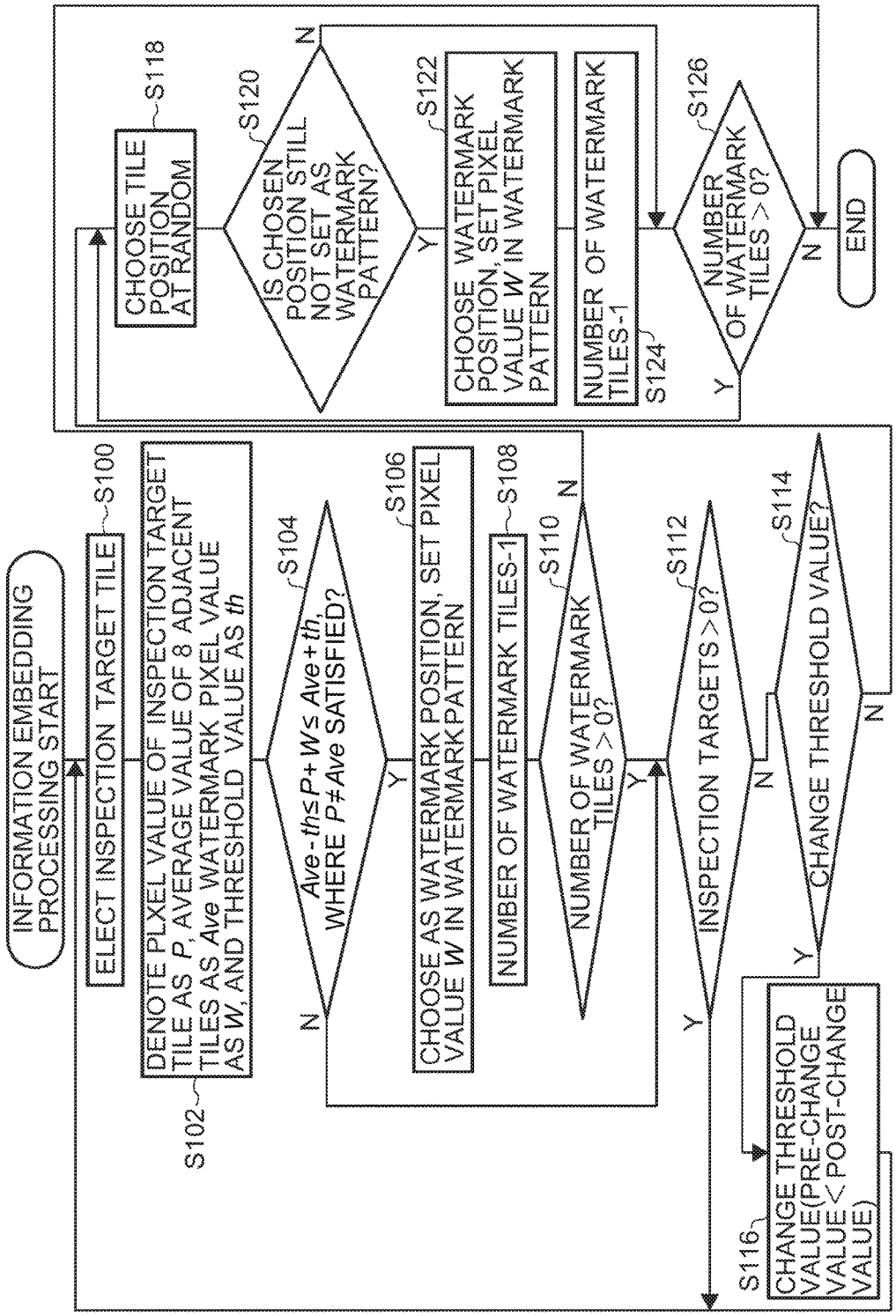

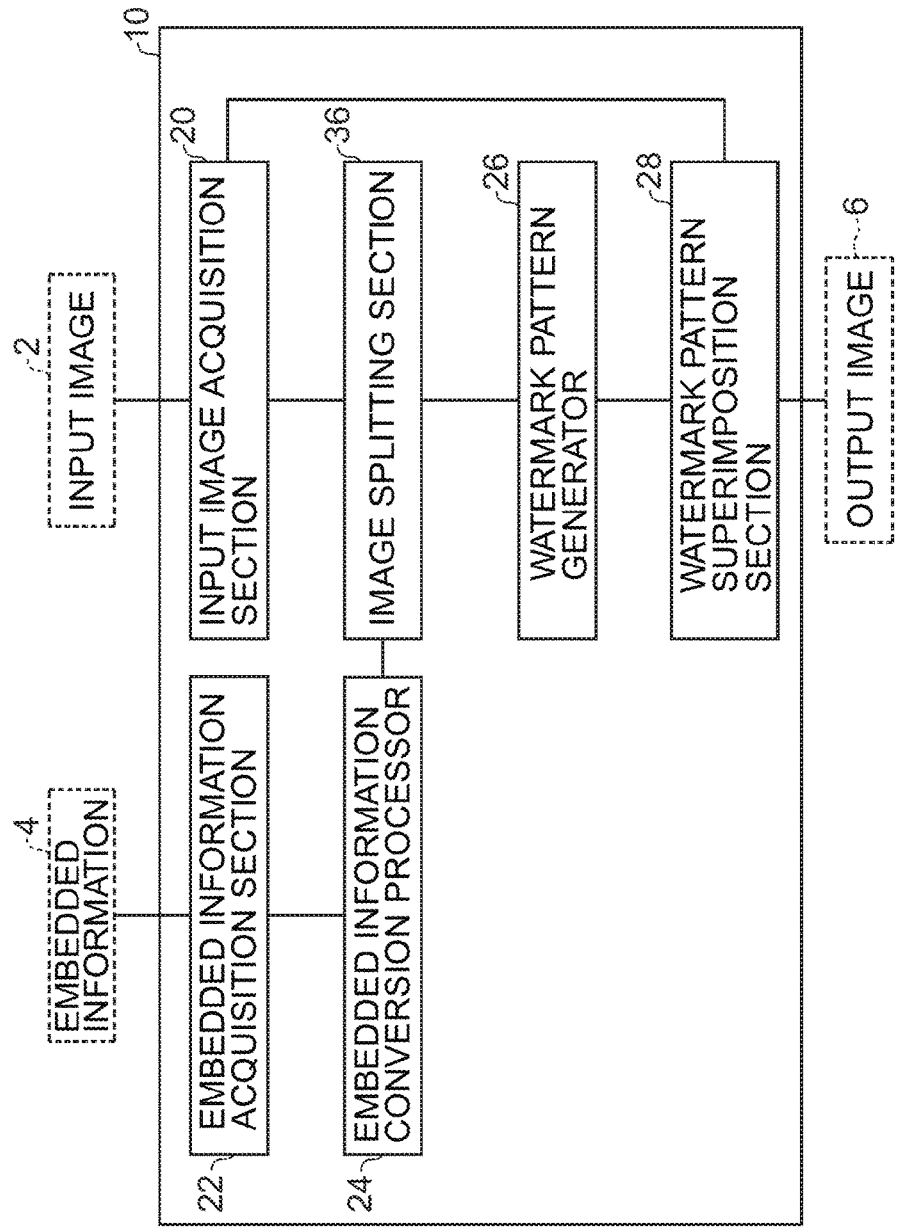

INPUT IMAGE 2

REGION A    REGION B

WATERMARK PATTERN A
(EMBEDDED INFORMATION 4A)

WATERMARK PATTERN B
(EMBEDDED INFORMATION 4B)

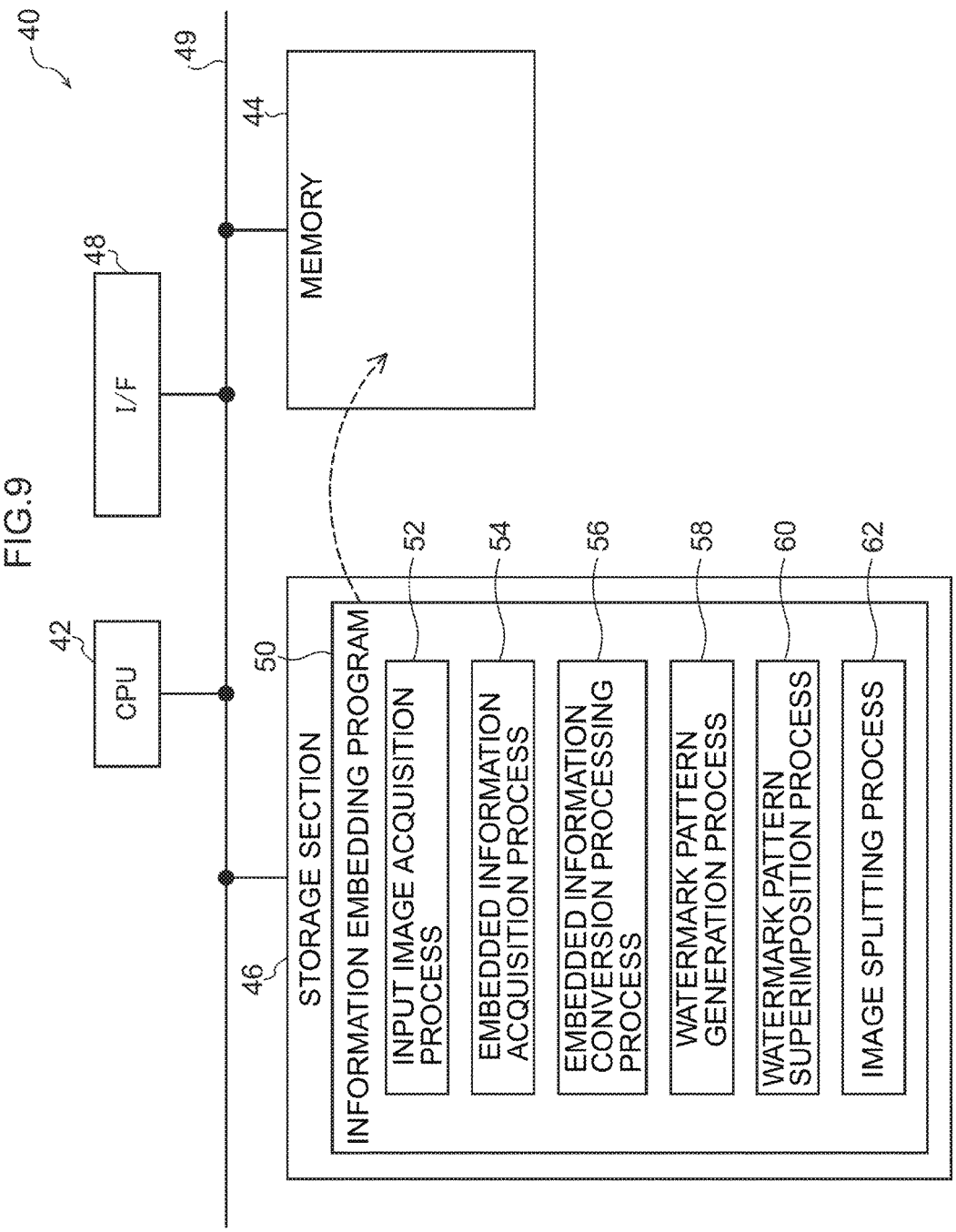

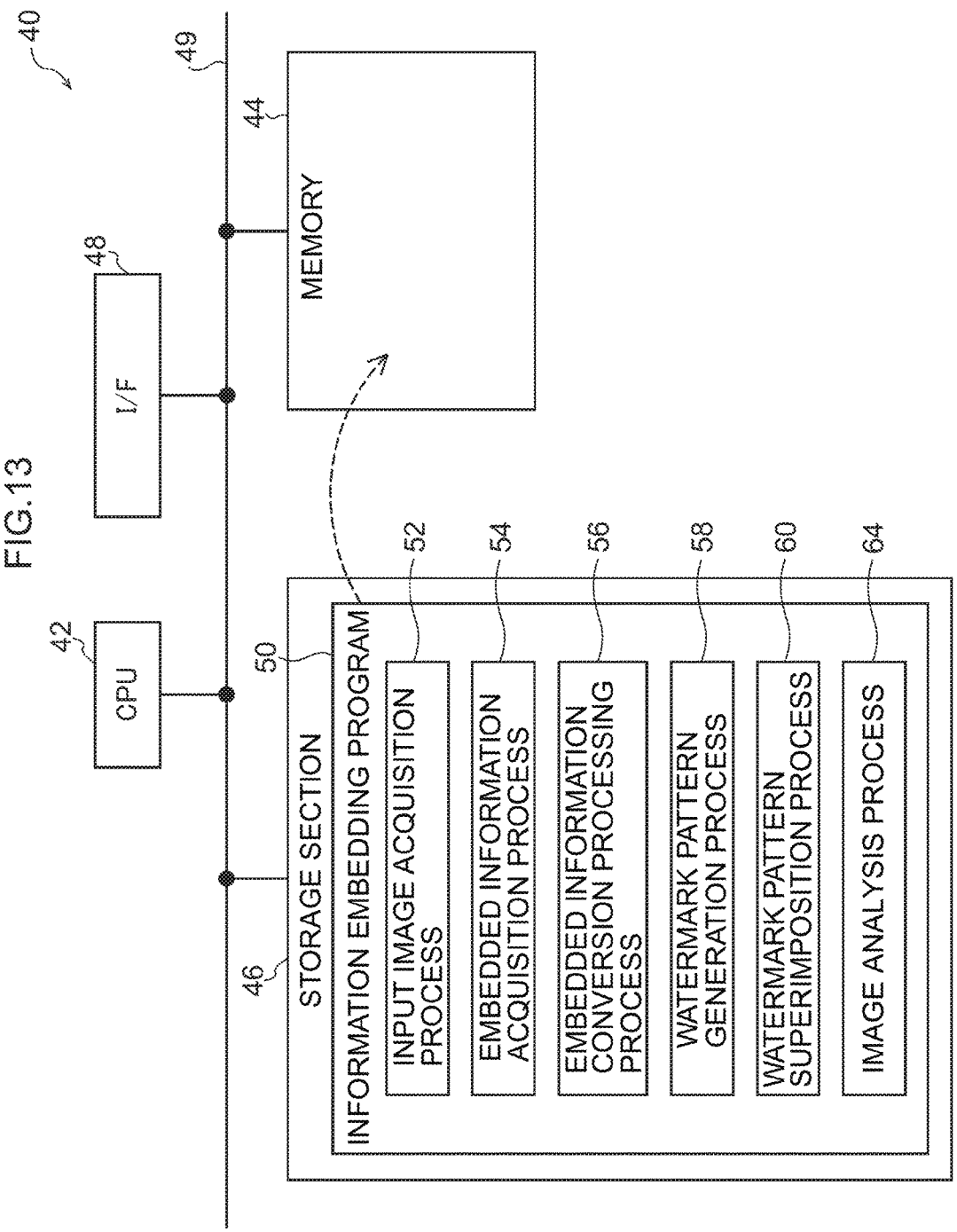

INFORMATION EMBEDDING DEVICE, INFORMATION EMBEDDING METHOD, AND RECORDING MEDIUM STORING PROGRAM

CROSS-REFERENCE TO RELATED APPLICATION

This application is based upon and claims the benefit of priority of the prior Japanese Patent Application No. 2015-173040, filed on Sep. 2, 2015, the entire contents of which are incorporated herein by reference.

FIELD

The embodiments discussed herein are related to an information embedding device, an information embedding method, a recording medium, and a program.

BACKGROUND

Technology is known for embedding information, known as watermark information, into image data. Embedding information into image data sometimes results in the embedded information becoming image noise, leading to image quality degradation, and technology that suppresses image quality degradation has therefore been proposed. Examples of such technology include a first technology in which frames with embedded watermark information and frames with embedded inverted information of the watermark information are provided in order to make the watermark information difficult to perceive by the human eye. There is also a second technology that suppresses image quality degradation by causing a number of regions where watermark information is embedded to periodically change as time elapses, and causing the average color of an image overall to periodically fluctuate as time elapses.

RELATED PATENT DOCUMENTS

Japanese Laid-Open Patent Publication No. 2007-36833
Japanese Laid-Open Patent Publication No. 2012-142741

SUMMARY

According to an aspect of the embodiments, an information embedding device includes a memory and a processor configured to execute a procedure. The procedure includes, from an image, detecting, as an embedding target pixel block, a pixel block having a pixel value that, after being changed by a specific value corresponding to information to be embedded into the image, will be within a first specific range of an average value of pixel values of a surrounding pixel block, and changing the pixel value of the detected embedding target pixel block by the specific value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a flowchart of an example of information embedding processing performed by an information embedding device according to the first exemplary embodiment;

FIG. 7 is a block diagram representing an example of a schematic configuration of an information embedding device according to a second exemplary embodiment;

FIG. 9 is a block diagram illustrating a schematic configuration of a computer that functions as an information embedding device according to the second exemplary embodiment;

FIG. 13 is a block diagram illustrating a schematic configuration of a computer that functions as an information embedding device according to the third exemplary embodiment;

DESCRIPTION OF EMBODIMENTS

Detailed explanation follows regarding an example of technology disclosed herein, with reference to the drawings.

First Exemplary Embodiment

Figure 1:
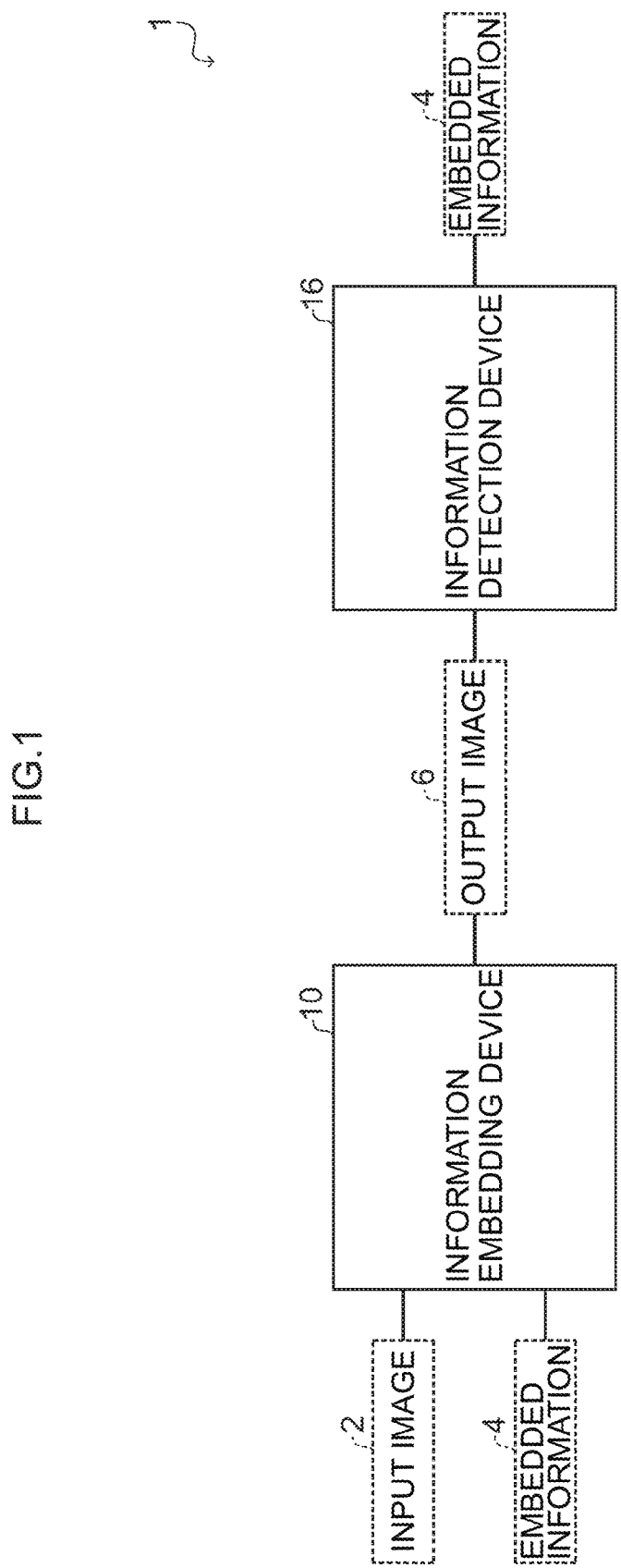
FIG. 1 is a schematic diagram illustrating an example of a configuration of an embedded information processing system.

First, explanation follows regarding an overall outline of an embedded information processing system according to an exemplary embodiment. FIG. 1 illustrates a configuration of an example of an embedded information processing system of the present exemplary embodiment. Note that in the present exemplary embodiment, explanation is regarding a mode in which an embedded information processing system 1 embeds information (embedded information 4), this being what is known as watermark information, into each frame of image data of a moving picture (an input image 2), and transmits in real-time.

As illustrated in FIG. 1, the embedded information processing system 1 of the present exemplary embodiment includes an information embedding device 10 and an information detection device 16.

The information embedding device 10 includes functionality for generating and outputting (transmitting) image data of an output image 6 (simply referred to as the "output image 6" hereafter) in which embedded information 4 is embedded into the input image 2. In a first exemplary embodiment, the information embedding device 10 embeds the embedded information 4 into the input image 2 by adding a watermark pixel value W to pixel values of a specific component of the input image 2 (described in detail below).

Figure 2:
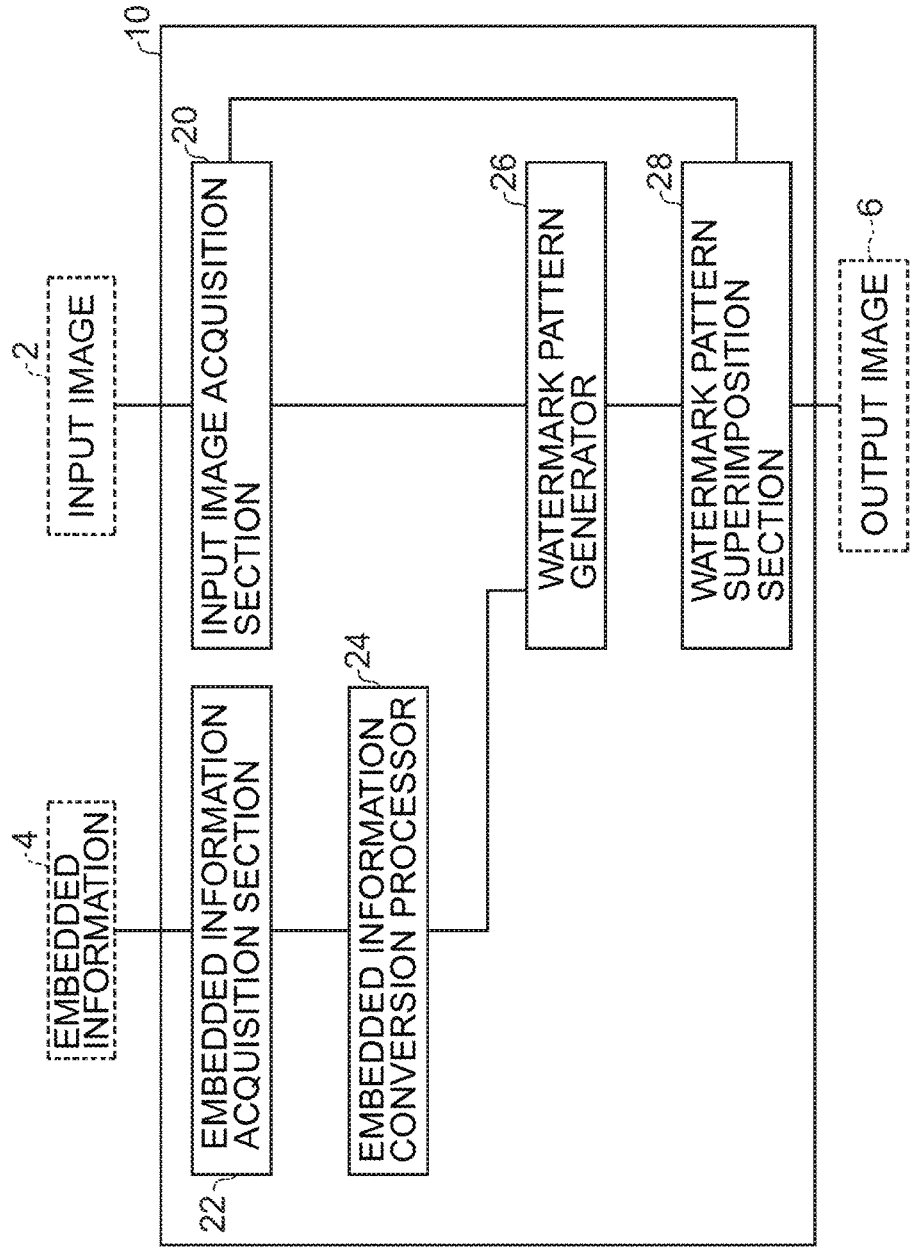
FIG. 2 is a schematic configuration diagram illustrating an example of an information embedding device according to a first exemplary embodiment.

FIG. 2 illustrates a schematic configuration of an example of the information embedding device 10 of the present exemplary embodiment. The information embedding device 10 of the first exemplary embodiment includes an input image acquisition section 20, an embedded information acquisition section 22, an embedded information conversion processor 24, a watermark pattern generator 26, and a watermark pattern superimposition section 28.

The input image acquisition section 20 includes functionality for acquiring the input image 2 from an external device (not illustrated in the drawings) and outputting the acquired input image 2 to the watermark pattern generator 26 and the watermark pattern superimposition section 28. In the first exemplary embodiment, the input image acquisition section 20 acquires image data of a moving picture from an external device as respective frames that each serve as a single input image 2. However, the input image acquisition section 20 may acquire image data of the moving picture and then split the image data into respective frames.

The embedded information acquisition section 22 includes functionality for acquiring the embedded information 4 from an external device (not illustrated in the drawings) and outputting the acquired embedded information 4 to the embedded information conversion processor 24. The content of the acquired embedded information 4 to be embedded into the input image 2 is not particularly limited. Examples of the content of the acquired embedded information 4 include an identification number of a transmission side, an identification number of a reception side, and information related to the input image 2. In cases in which the input image 2 is an image of a product in a television shopping program, specific examples of information related to the input image 2 include information related to the product, or information related to purchase of the product. Moreover, the information related to the input image 2 may, for example, be information representing the copyright on the input image 2 or on the original moving picture.

The embedded information conversion processor 24 converts the embedded information 4 that has been output from the embedded information acquisition section 22 into watermark pixel values W and the number thereof (number of watermark tiles, explained next), and outputs the watermark pixel values W and the number thereof to the watermark pattern generator 26. In the present exemplary embodiment, the blocks making up the smallest units of watermark patterns for embedding the embedded information 4 are referred to as "tiles". Tiles set with the watermark pixel values W are referred to as "watermark tiles". The minimum tile size is 1×1 pixels (1 tile=1 pixel), and in the present exemplary embodiment, explanation follows regarding a case in which the size of the tiles is 1×1 pixels.

The watermark pixel values W may be predetermined values, or may be values that differ according to the embedded information 4 or the input image 2. In the present exemplary embodiment (see FIG. 3, described below), explanation follows regarding a case that employs "+1" as the watermark pixel values W.

Note that the conversion method that converts the embedded information 4 into watermark pixel values W and the number of watermark tiles is not particularly limited, and specific examples thereof include technology described by JP-A No. 2012-142741.

The watermark pattern generator 26 is an example of a detection section of technology disclosed herein, and includes functionality for choosing positions for watermark tiles (watermark embedding positions) and setting watermark tile patterns based on the input image 2. Note that the "watermark pattern" of the present exemplary embodiment refers to an image superimposed onto a single input image 2 (a pattern of watermark pixel values W set for all of the watermark tiles).

Explanation follows regarding embedding of the embedded information 4 into the input image 2 by the information embedding device 10.

The information embedding device 10 chooses, as a watermark embedding position, a pixel (tile) having a pixel value with a difference from the pixel values of surrounding pixels of a value equal to the watermark pixel value W with opposite sign (an inverse element). Since the watermark pixel value W is "+1" in the present exemplary embodiment as described above, a pixel (tile) having a pixel value that differs from those of the surrounding pixels (tiles) by "−1" is chosen as the watermark embedding position.

Figure 3:
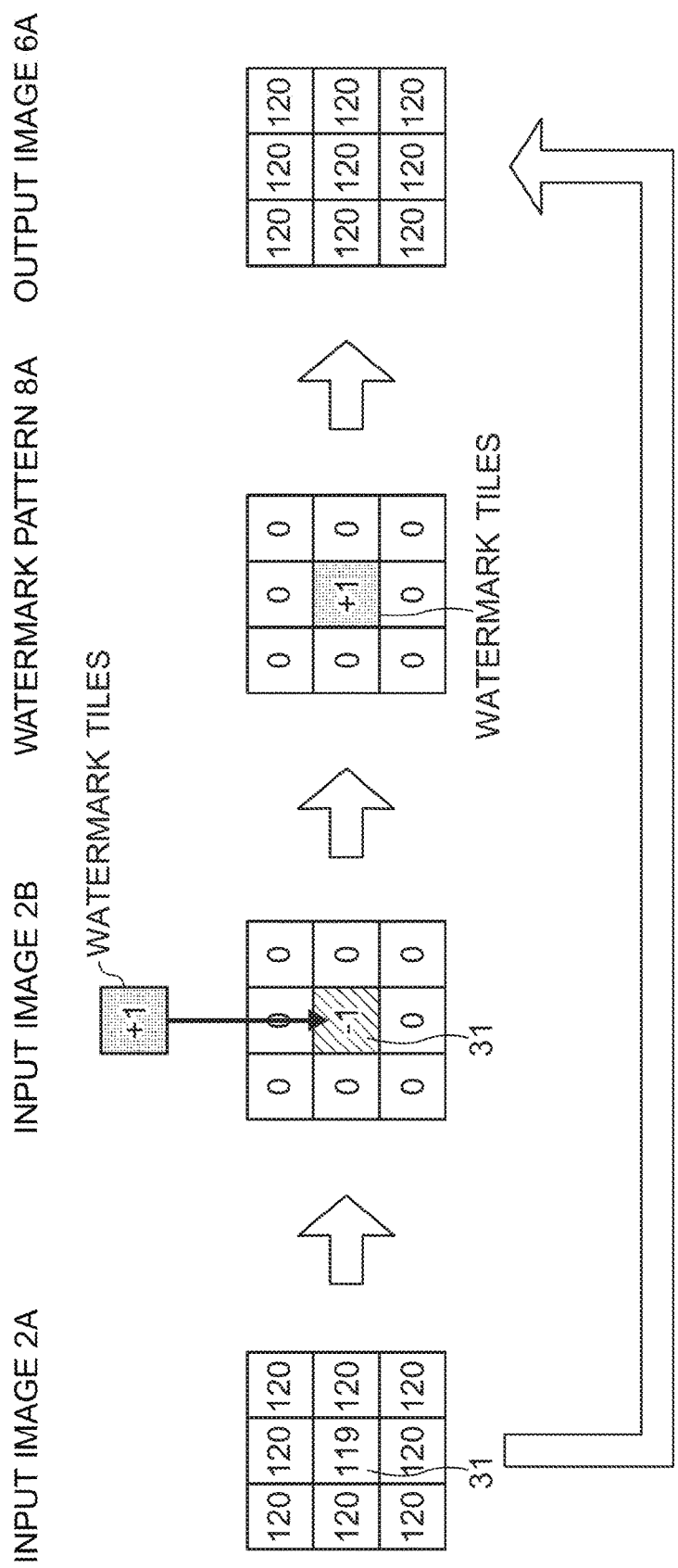
FIG. 3 is an explanatory diagram for explaining embedding of embedded information using an information embedding device according to the first exemplary embodiment.

The specific example illustrated in FIG. 3 represents a case in which the number of pixels of the input image 2 (an input image 2A) is 3×3=9. In the input image 2A, the pixel value of the central pixel 31 is "119", and the pixel values of the eight pixels surrounding the central pixel 31 are each "120". The difference between the pixel value of the central pixel 31 and the surrounding pixels can be represented as an input image 2B. In the input image 2B, the pixel value of the central pixel 31 relative to the surrounding pixels is "−1".

Accordingly, the relative pixel value of the central pixel 31 is a value equal to the watermark pixel value W, "+1", with opposite sign (the values have different signs, but the same absolute value). The information embedding device 10 therefore chooses the central pixel 31 as the watermark embedding position and sets the chosen position to a watermark pattern 8. FIG. 3 illustrates an example of the watermark pattern as a watermark pattern 8A, and illustrates an example of the output image 6, in which the watermark pattern 8A is superimposed onto the input image 2A, as an output image 6A.

A watermark pattern (watermark tile) superimposed onto the input image 2 will generally become noise in the input image 2. In the specific example illustrated in FIG. 3, the watermark pattern 8A becomes noise of a pixel value "+1", which is the watermark pixel value W. However, there is a high probability that a pixel having a pixel value different from those of the surrounding pixels, like that illustrated in the input image 2A (the central pixel 31), is noise that was originally present in the input image 2. Moreover, even when the pixel having a pixel value different from those of the surrounding pixels is not noise in the input image 2, this pixel is often not noticeable even when a watermark tile (the watermark pixel value W) has been superimposed thereon.

Thus, as the watermark embedding position, the information embedding device 10 chooses a position that can be treated as being a position where noise occurred with the opposite sign to that of the watermark pixel value W in the input image 2. Choosing in this manner enables noise reduction to be achieved by cancelling out noise originally present in the input image 2 with noise caused by embedding the watermark pattern 8, thereby enabling degradation of the image quality of the input image 2 to be suppressed.

The watermark pattern superimposition section 28 of the information embedding device 10 is an example of an embedding section of technology disclosed herein, and includes functionality for generating and outputting the output image 6 by superimposing (combining) the watermark pattern generated by the watermark pattern generator 26 onto the input image 2.

Thus, the output image 6 is a moving picture that has been output from the information embedding device 10, and is input to the information detection device 16. Note that the method of causing the output image 6 to be input to the information detection device 16 is not particularly limited. Specific examples include a case in which the information embedding device 10 includes a display section such as a monitor (not illustrated in the drawings) and the information detection device 16 includes an imaging section such as a camera (not illustrated in the drawings). In such cases, the output image 6 can be input to the information detection device 16 by, for example, imaging the output image output image 6 displayed on the display section of the information embedding device 10 using the camera of the information detection device 16. Specific examples of the information detection device 16 in such cases include a tablet terminal provided with camera functionality, or personal digital assistants (PDAs) such as smart phones.

The information detection device 16 includes functionality for detecting and outputting the embedded information 4 from the inputted output image 6. The method by which the information detection device 16 detects the embedded information 4 is not particularly limited as long as the method accords with the embedded information 4 and the conversion method of the embedded information conversion processor 24 of the information embedding device 10.

Figure 4:
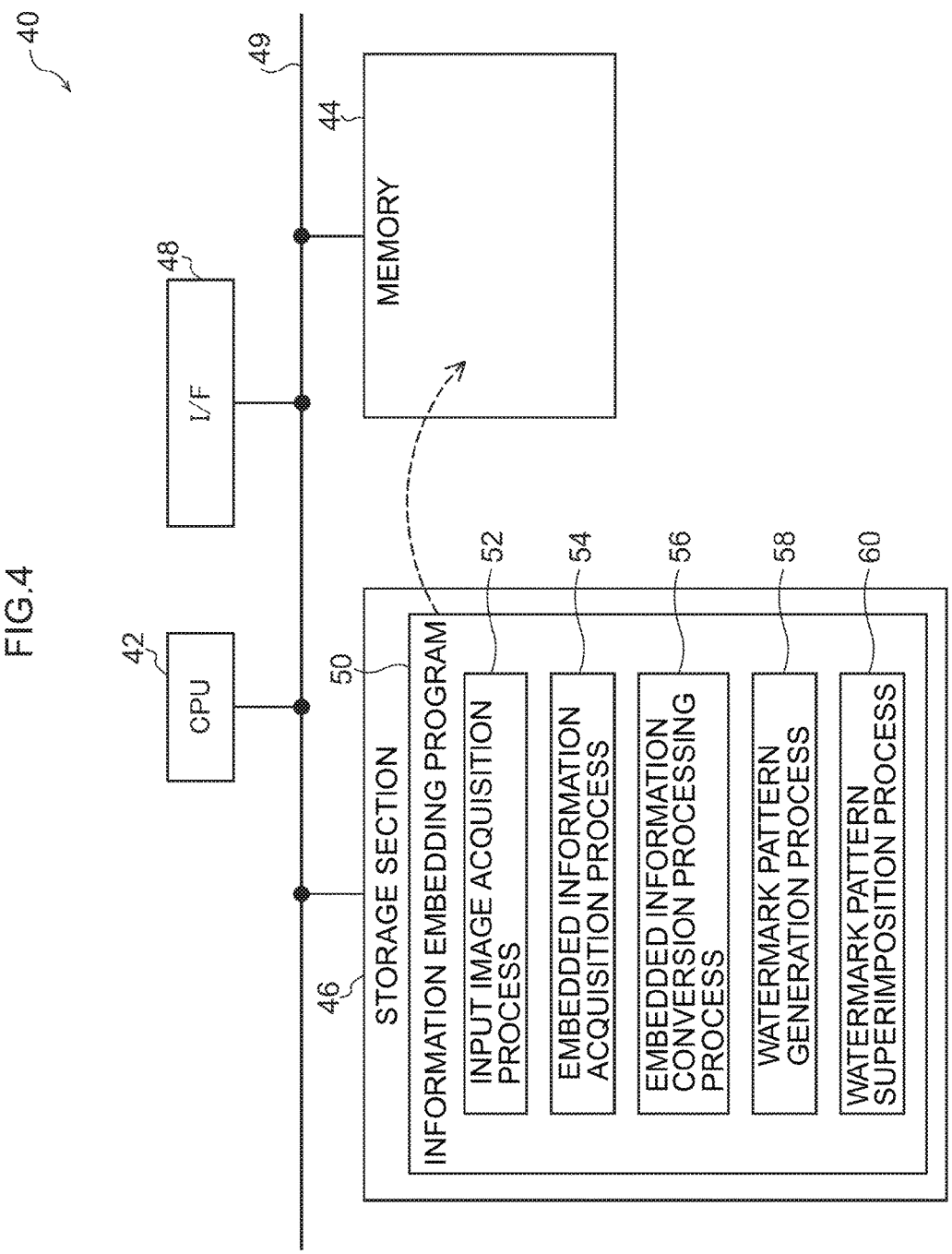
FIG. 4 is a block diagram illustrating a schematic configuration of a computer that functions as an information embedding device according to the first exemplary embodiment.

The information embedding device 10 may be implemented by, for example, the computer 40 illustrated in FIG. 4. More specifically, the information embedding device 10 may be implemented by the computer 40 functioning as a server. The computer 40 includes a central processing unit (CPU) 42, memory 44, a non-volatile storage section 46, and an interface (I/F) 48. The CPU 42, the memory 44, the storage section 46, and the I/F 48 are connected to one another through a bus 49. An external device is connected to the I/F 48, and the input image 2 and the embedded information 4 are input to the I/F 48 from the external device.

The storage section 46 may be implemented by a hard disk drive (HDD), flash memory, or the like. An information embedding program 50 for causing the computer 40 to function as the information embedding device 10 is stored in the storage section 46. The CPU 42 reads the information embedding program 50 from the storage section 46, expands the information embedding program 50 into the memory 44, and executes the processes included in the information embedding program 50.

The information embedding program 50 includes an input image acquisition process 52, an embedded information acquisition process 54, an embedded information conversion processing process 56, a watermark pattern generation process 58, and a watermark pattern superimposition process 60. The CPU 42 operates as the input image acquisition section 20 by executing the input image acquisition process 52. The CPU 42 also operates as the embedded information acquisition section 22 by executing the embedded information acquisition process 54. The CPU 42 also operates as the embedded information conversion processor 24 by executing the embedded information conversion processing process 56. The CPU 42 also operates as the watermark pattern generator 26 by executing the watermark pattern generation process 58. The CPU 42 also operates as the watermark pattern superimposition section 28 by executing the watermark pattern superimposition process 60.

The computer 40, which executes the information embedding program 50, thereby functions as the information embedding device 10.

Note that the computer 40 is not limited to what is known as a desktop personal computer. The computer 40 may be a laptop personal computer, or may be a tablet terminal, a PDA such as a smartphone, or the like.

The information embedding device 10 may also be implemented by, for example, a semiconductor integrated circuit, and more specifically, by an application specific integrated circuit (ASIC) or the like.

Next, explanation follows regarding operation of the information embedding device 10 according to the present exemplary embodiment.

FIG. 5 illustrates an example of information embedding processing executed by the watermark pattern generator 26 of the information embedding device 10. The information embedding processing illustrated in FIG. 5 is, for example, executed in cases in which the input image 2 has been acquired by the input image acquisition section 20 and the embedded information 4 has been acquired by the embedded information acquisition section 22, and the embedded information 4 has been converted into watermark pixel values W and a number of watermark tiles by the embedded information conversion processor 24.

At step S100, the watermark pattern generator 26 elects an inspection target tile (1 tile) from out of the input image 2.

At the next step S102, the watermark pattern generator 26 denotes the pixel value of the inspection target tile (the value relative to those of the surrounding pixels) as P, denotes the average value of the pixel values of the eight adjacent (surrounding) tiles as Ave, denotes the watermark pixel value W as W, and denotes a threshold value as th (the threshold value th has an initial value=0). Then, at the next step S104, the watermark pattern generator 26 determines whether or not Equation (1) below is satisfied. Note that the watermark pixel value W is an example of a specific value of technology disclosed herein.

$$Ave-th \leq P+W \leq Ave+th \text{ (where } P \neq Ave\text{)} \tag{1}$$

In cases in which the pixel value P of the inspection target tile is equal to the average value Ave of the pixel values of the surrounding tiles, there is a high probability that the inspection target tile is not noise, and that the watermark tile would, conversely, be noticeable as noise were the inspection target tile to be chosen as a watermark embedding position. The present exemplary embodiment therefore employs the condition that the pixel value P of the inspection target tile differs from the average value Ave in Equation (1) above.

As described above, given pixels for which the difference between the average value Ave of the pixel values of the surrounding pixels and the pixel value of the given pixel has the opposite sign to that of the watermark pixel value W but the same absolute value (pixels for which |P−Ave|=|W| and P−Ave≠W) are preferably chosen as watermark embedding positions from out of the input image 2. However, places that can be chosen as the watermark embedding position under the above condition sometimes do not amount to the number of watermark tiles obtained from the embedded information conversion processor 24.

The threshold value th therefore has an initial value equal to 0 in the information embedding device 10 of the present exemplary embodiment. Note that in cases in which the threshold value th=0, the pixel value of the inspection target tile relative to the surrounding pixels sometimes has the opposite sign to that of the watermark pixel value W but the same absolute value. Moreover, as in Equation (1), when the pixel value P of the inspection target tile+the watermark pixel value W is within a specific range determined by the threshold value th so as to be centered on the average value Ave, that inspection target tile is chosen as a watermark tile. Moreover, when the total number of chosen watermark tiles does not amount to the number of watermark tiles obtained from the embedded information conversion processor 24, the processing of steps S100 to S112 are repeated while increasing the threshold value th in steps.

Although it is not necessary to provide a maximum value for the threshold value th, it is preferable to provide a maximum value since the watermark embedding position will be chosen similarly to in cases in which the watermark embedding position were chosen at random, and will have a high probability of being perceived as noise, when the threshold value th reaches a certain value or above. The manner in which the maximum value of the threshold value th is provided is not particularly limited, and the maximum value may be determined according to the resolution, type, and so on of the input image 2, or may be a variable value.

In cases in which there is variation in the pixel values of the surrounding tiles, for example, due to being at an edge portion of the image, it is sometimes not preferable to choose that inspection target tile as a watermark embedding position even in cases in which the pixel value P of the inspection target tile satisfies Equation (1). It is therefore preferable that the difference between the pixel value of each tile out of the eight surrounding tiles and the average value Ave is within a specific range. For example, when electing inspection target tiles at step S100 above, election as an inspection target tile is preferably not made when the difference between the pixel value of each tile of the surrounding tiles and the average value Ave thereof is not within the specific range.

Moreover, cases in which Equation (1) above is satisfied also include cases in which the pixel value P of the inspection target tile (the value relative to the surrounding pixels) and the watermark pixel value W have the same sign. In the present exemplary embodiment, even in such cases, when Equation (1) above is satisfied, it may be determined that the watermark tile (the watermark pattern) will not be noticeable as noise, and may be chosen as a watermark embedding position. However, as described above, it is preferable that the pixel value P of the inspection target tile has a different sign from the watermark pixel value W in order to cancel out noise in the input image 2 with the watermark pixel value W, which would normally have become noise. Step S104A illustrated in FIG. 6A is therefore preferably executed instead of step S104 in the information embedding processing.

Figure 6A:
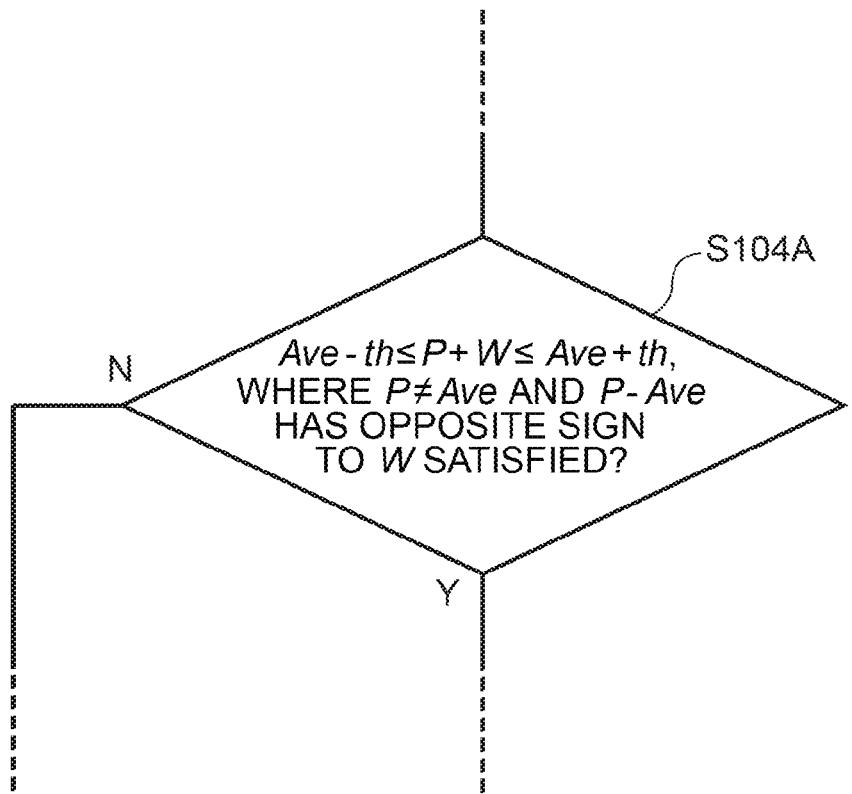
FIG. 6A is a flowchart illustrating another example of the step S104 of the information embedding processing performed by the information embedding device according to the first exemplary embodiment.
Figure 6B:
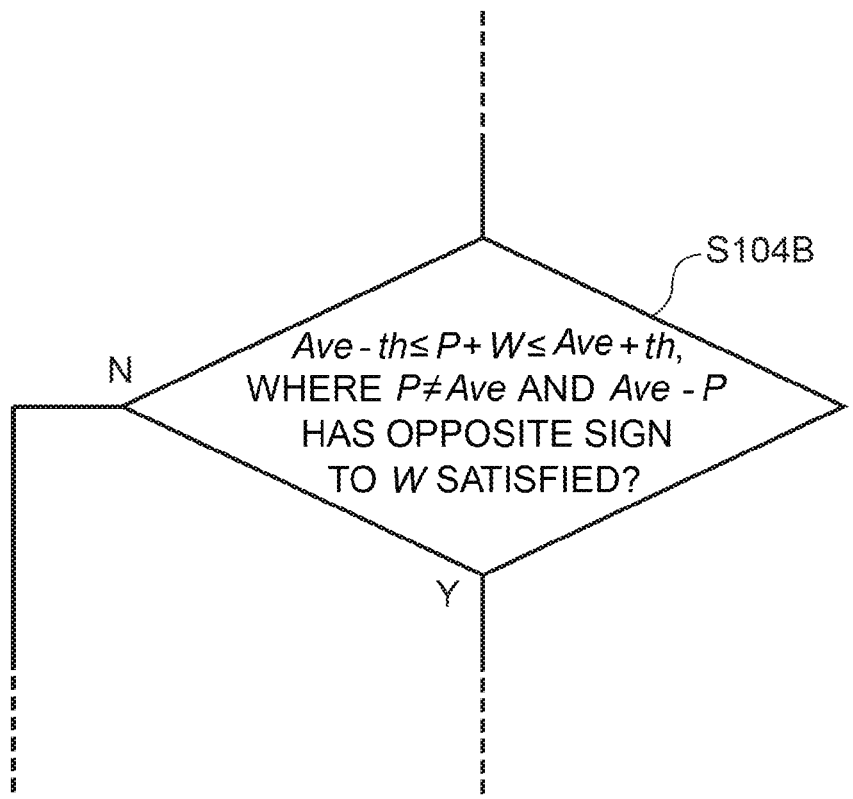
FIG. 6B is a flowchart illustrating another example of the step S104 of the information embedding processing performed by the information embedding device according to the first exemplary embodiment.

At step S104A illustrated in FIG. 6A, affirmative determination is made in cases in which, in addition to the condition of step S104 above (Equation (1)), a value obtained by subtracting the average value Ave from the pixel value P of the inspection target tile has the opposite sign to that of the watermark pixel value W. Step S104A illustrated FIG. 6A illustrates a case in which the watermark pixel value W is "+1", namely, a case in which the watermark pixel value W has a positive value. In cases in which the watermark pixel value W is a negative value, step S104B illustrated in FIG. 6B may be executed instead of step S104.

Moreover, Equation (2) below may be applied instead of Equation (1) above.

$$Ave-P<P+W<Ave+P \text{ (where } P\neq Ave\text{)} \quad (2)$$

In Equation (2) above, watermarks are embedded by embedding watermarks in cases in which the difference between the pixel value and the surrounding pixels is reduced, thereby enabling noise to be reliably suppressed.

In cases in which the inspection target tile is positioned at an edge portion of the input image 2, the number of surrounding tiles becomes less than 8. In such cases, the average value Ave of the pixel values of the surrounding tiles may be employed irrespective of the number of surrounding tiles, or configuration may be made such that tiles are not elected as inspection target tiles (watermark tiles) in cases in which the number of surrounding tiles is a specific number or less (where the specific number <8).

Processing transitions to step S112 in cases in which Equation (1) is not satisfied. However, processing transitions to step S106 in cases in which Equation (1) is satisfied.

At step S106, the watermark pattern generator 26 chooses the position of the inspection target tile as a watermark embedding position, and sets the watermark pixel value W at the position of the watermark pattern 8 that corresponds to the chosen position.

At the next step S108, the watermark pattern generator 26 subtracts 1 from the number of watermark tiles for which a position has still not been determined (number of watermark tiles −1).

At the next step S110, the watermark pattern generator 26 determines whether or not there are watermark tiles for which a position has still not been determined (number of watermark tiles >0). In cases in which all of the watermark embedding positions have been chosen, negative determination is made and the current information embedding processing ends. However, in cases in which there are watermark tiles for which a position has still not been determined, affirmative determination is made and processing transitions to step S112.

At step S112, the watermark pattern generator 26 determines whether or not there are tiles that have still not been targeted for inspection (inspection targets >0). In cases in which there are tiles that have still not been targeted for inspection, affirmative determination is made, processing returns to step S100, and the processing of step S100 onward is repeated. However, in cases in which election of all of the tiles (pixels) of the input image 2 as inspection targets has completed, negative determination is made, and processing transitions to step S114.

At step S114, the watermark pattern generator 26 determines whether or not to change the threshold value th. In cases in which a maximum value has been provided for the threshold value th as described above, determination is made as to whether or not the threshold value th employed at step S104 above is the maximum value, and in cases in which the employed threshold value th is not the maximum value, affirmative determination is made for changing the threshold value th, and processing transitions to step S116. At step S116, after the threshold value th to be employed in Equation (1) in step S104 above has been changed (pre-change threshold value th<post-change threshold value th), processing returns to step S100 and the watermark pattern generator 26 repeats the processing of step S100 onward.

However, in cases in which the threshold value th is not changed, negative determination is made and processing transitions to step S118.

At step S118, the watermark pattern generator 26 chooses a tile position at random from out of the input image 2. Note that the watermark pattern generator 26 may choose completely at random, or may make a random choice based on specific conditions. For example, a random choice may be made from out of a region that excludes a specific region of the input image 2 (a region that depends on a predetermined position, or a region that depends on a predetermined image).

At the next step S120, the watermark pattern generator 26 determines whether or not the chosen position has still not been set as a watermark pattern. More specifically, the watermark pattern generator 26 determines whether or not the position chosen at step S118 above has already been set as a watermark pattern at step S106 above.

In cases in which the chosen position is not a position still to be set (cases in which the chosen position has already been set to the watermark pattern), negative determination is made and processing transitions to step S126. However, in cases in which the chosen position has still not been set, affirmative determination is made and processing transitions to step S122.

At step S122, the watermark pattern generator 26 chooses the position chosen at step S118 as a watermark embedding position, and sets the watermark pixel value W at the position of the watermark pattern 8 corresponding to the chosen position.

At the next step S124, the watermark pattern generator 26 subtracts 1 from the number of watermark tiles for which the position has still not been set (number of watermark tiles −1).

At the next step S126, the watermark pattern generator 26 determines whether or not there are watermark tiles for which the position has still not been set (number of watermark tiles >0). In cases in which there are watermark tiles for which the position has still not been set, affirmative determination is made, processing returns to step S118, and the processing of steps S118 to S126 is repeated. However, in cases in which all of the watermark embedding positions have been chosen, negative determination is made and the information embedding processing ends.

Second Exemplary Embodiment

In the first exemplary embodiment, explanation has been given regarding a case in which a single item of embedded information 4 is embedded into a single input image 2. In a second exemplary embodiment, explanation follows regarding a case in which plural items of the embedded information 4 are embedded into a single input image 2.

The overall outline of the embedded information processing system 1 (see FIG. 1) is similar to in the first exemplary embodiment above, and explanation is therefore omitted.

FIG. 7 illustrates an example of a schematic configuration of the information embedding device 10 according to the second exemplary embodiment.

Figure 8A:
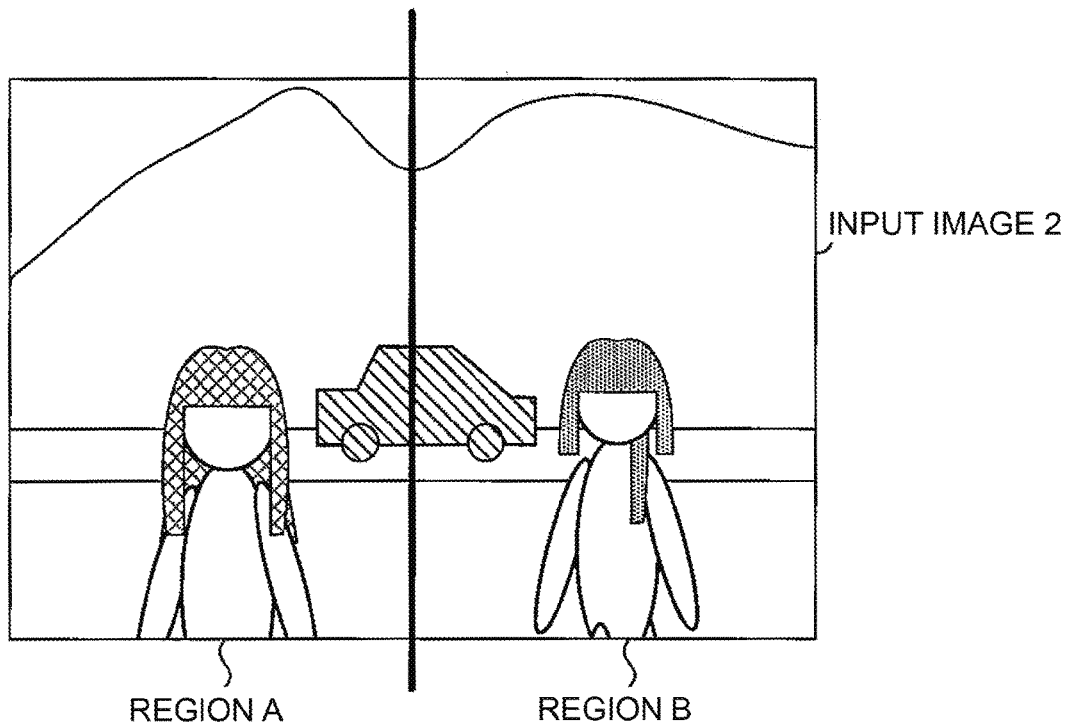
FIG. 8A is an explanatory diagram for explaining embedding of embedded information in the information embedding device of the second exemplary embodiment.
Figure 8B:
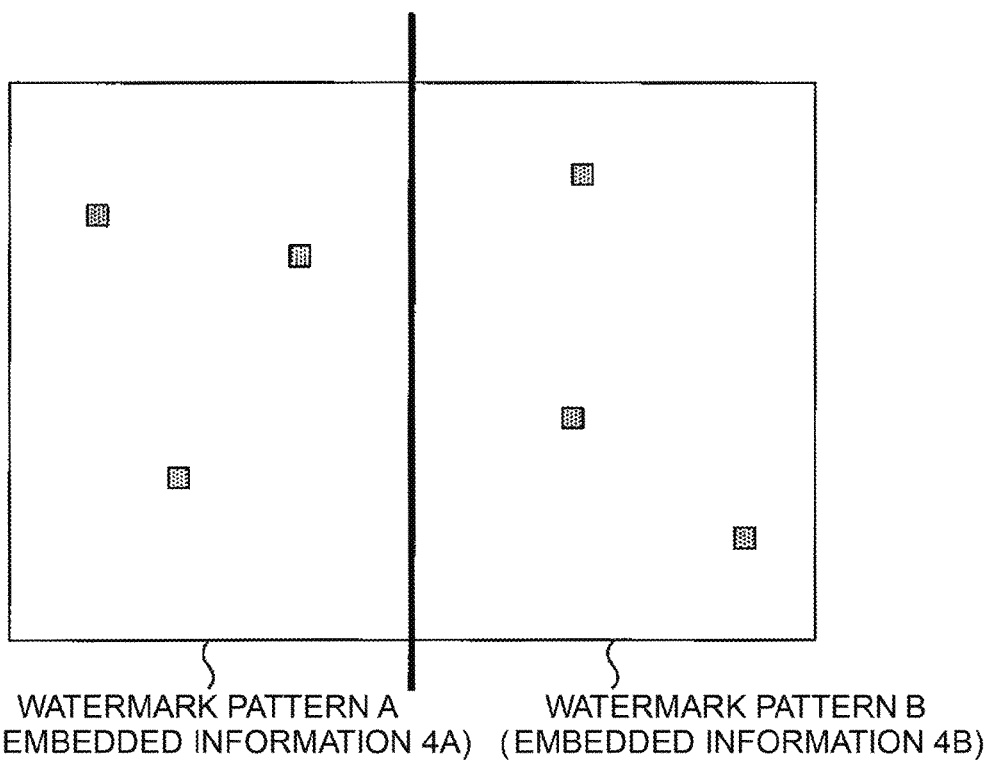
FIG. 8B is an explanatory diagram for explaining embedding of embedded information in the information embedding device of the second exemplary embodiment.

As illustrated in FIG. 7, the information embedding device 10 of the second exemplary embodiment further includes an image splitting section 36, in contrast to the information embedding device 10 of the first exemplary embodiment. The image splitting section 36 includes functionality for splitting the input image 2 into plural regions (two in the present exemplary embodiment). FIG. 8A and FIG. 8B illustrate explanatory diagrams for embedding the items of embedded information 4A, 4B using the information embedding device 10 of the present exemplary embodiment.

In the specific example illustrated by FIG. 8A, a case is illustrated in which a single input image 2 is split into a left-right pair of regions (a region A and a region B), and respective items of embedded information 4A, 4B are embedded into respective regions. More specifically, as illustrated in FIG. 8B, the embedded information 4A is embedded by superimposing a watermark pattern A onto the region A, and the embedded information 4B is embedded by superimposing a watermark pattern B onto the region B.

The watermark pattern generator 26 of the second exemplary embodiment generates the watermark pattern A that embeds the embedded information 4A into the region A, and generates the watermark pattern B that embeds the embedded information 4B into the region B. The watermark pattern superimposition section 28 then generates the output image 6 by superimposing the watermark pattern A onto the region A of the input image 2 and superimposing the watermark pattern B onto the region B of the input image 2, and outputs the generated output image 6.

The information embedding device 10 of the second exemplary embodiment may, for example, be implemented by the computer 40 illustrated in FIG. 9. In the computer 40 illustrated in FIG. 9, the information embedding program 50 stored in the storage section 46 differs from that of the computer 40 explained by the first exemplary embodiment. The information embedding program 50 of the second exemplary embodiment further includes an image splitting process 62 in addition to each of the processes included in the information embedding program 50 explained by the first exemplary embodiment.

The CPU 42 operates as the image splitting section 36 by executing the image splitting process 62. The computer 40, which executes the information embedding program 50, thereby functions as the information embedding device 10 of the second exemplary embodiment.

Figure 10:
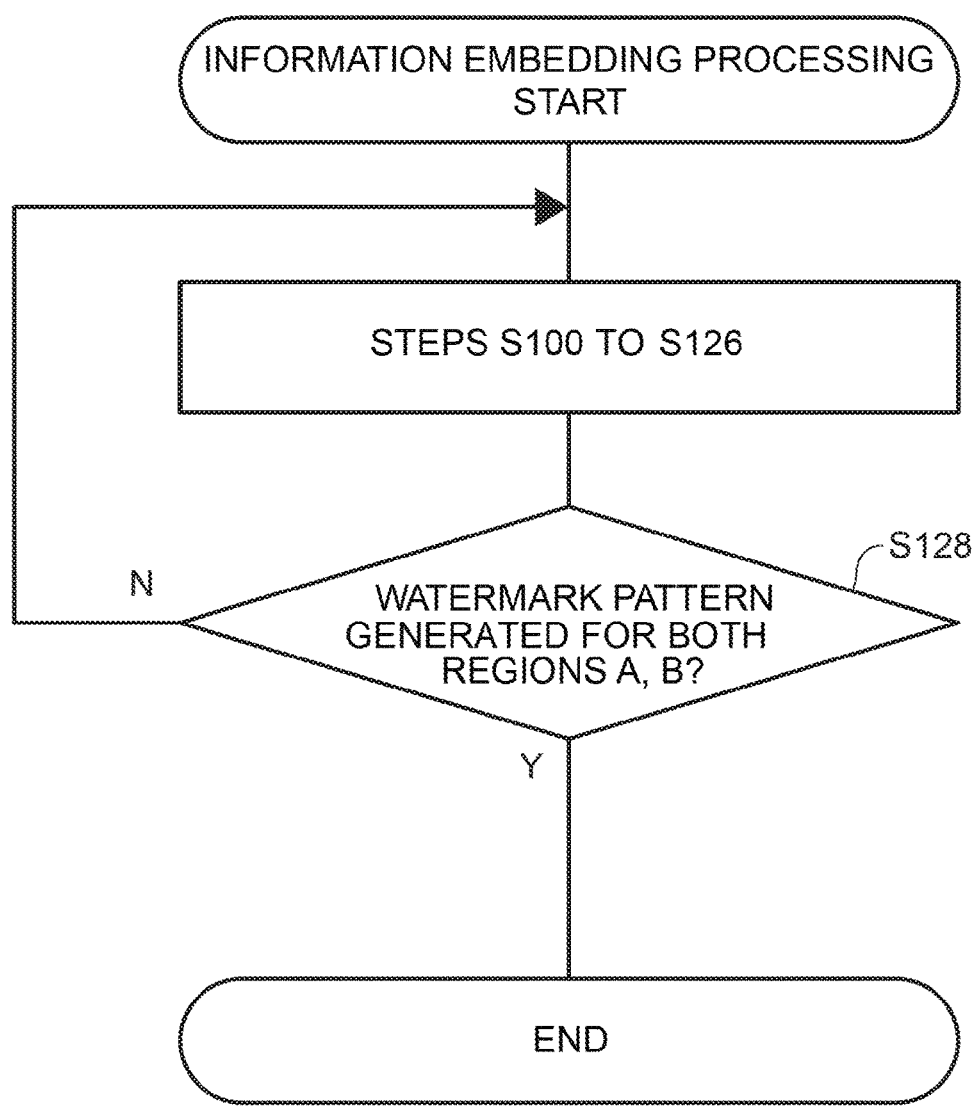
FIG. 10 is a flowchart of an example of information embedding processing executed by a watermark pattern generator of an information embedding device according to the second exemplary embodiment.

Next, explanation follows regarding operation of the information embedding device 10 according to the second exemplary embodiment. FIG. 10 illustrates an example of information embedding processing executed by the watermark pattern generator 26 of the information embedding device 10.

In the information embedding processing of the second exemplary embodiment, first, the watermark pattern A corresponding to the embedded information 4A is generated by executing the processing of steps S100 to S126 of the information embedding processing of the first exemplary embodiment (see FIG. 5) for the region A.

At the next step S128, the watermark pattern generator 26 determines whether or not the watermark patterns (A, B) have been generated for both the region A and the region B. In cases in which the watermark pattern B of the region B has not been generated, negative determination is made, processing returns to step S100, and the watermark pattern B is generated corresponding to the embedded information 4B by executing the processing of steps S100 to S126 above.

However, the information embedding processing of the second exemplary embodiment ends in cases in which affirmative determination is made at step S128.

Since the items of embedded information 4A, 4B are respectively embedded into plural regions obtained by splitting a single input image 2 in this manner, plural items of the embedded information 4 (4A, 4B) can be embedded into a single input image 2.

Although explanation has been given in the present second exemplary embodiment regarding a case in which the input image 2 is split into a left-right pair of regions (region A and region B), the number of regions to be split into and the splitting method are not particularly limited. For example, the number to split into may be 3 or more, and the input image 2 may be vertically split into regions.

Although explanation has been given in the second exemplary embodiment regarding a case in which the information embedding device 10 includes the image splitting section 36 and splits the input image 2, there is no limitation thereto. A device external to the information embedding device 10 may generate images corresponding to the input image 2 split into region A and region B, and the images of each region and the corresponding items of embedded information 4 thereof may be input to the information embedding device 10.

Third Exemplary Embodiment

In a third exemplary embodiment, explanation follows regarding a mode in which plural items of the embedded information 4 are embedded into a single input image 2 by a method different from that of the second exemplary embodiment. Namely, in the third exemplary embodiment, explanation follows regarding a case in which embedded information 4, corresponding to a specific image extracted from the input image 2, is embedded into that specific image.

The overall outline of the embedded information processing system 1 (see FIG. 1) is similar to that of the first exemplary embodiment, and explanation thereof is therefore omitted.

Figure 11:
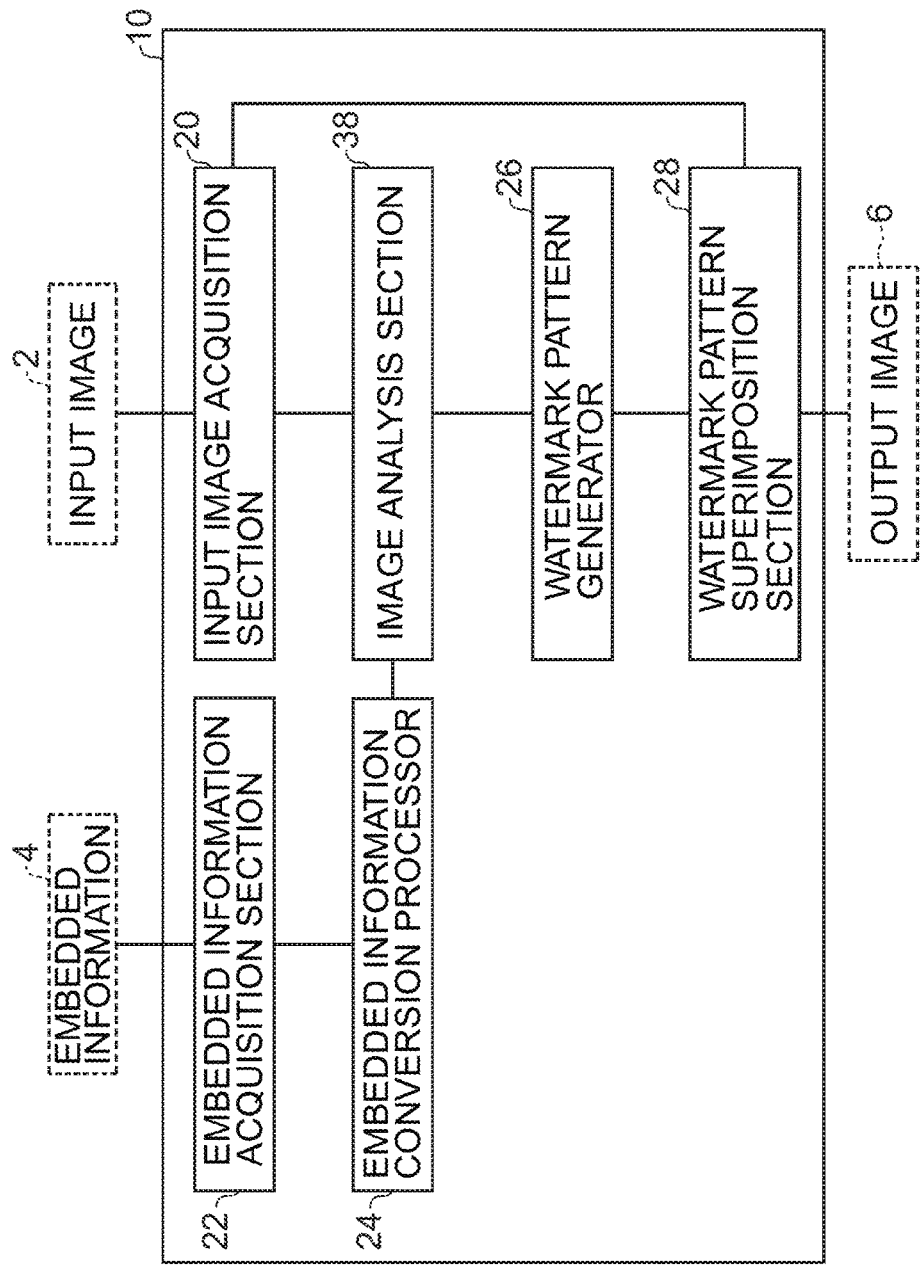
FIG. 11 is a block diagram representing a schematic configuration of an example of an information embedding device according to a third exemplary embodiment.

FIG. 11 illustrates a schematic configuration of an example of the information embedding device 10 according to the third exemplary embodiment. As illustrated in FIG. 11, in contrast to the information embedding device 10 explained by the second exemplary embodiment, the information embedding device 10 of the third exemplary embodiment is provided with an image analysis section 38 instead of the image splitting section 36. The image analysis section 38 splits the input image 2 by image-analyzing the input image 2 and extracting specific images from the input image 2. The method of image-analysis is not particularly limited, and an existing image-analysis method may be employed according to the extracted specific image (the partial image, described below).

Figure 12A:
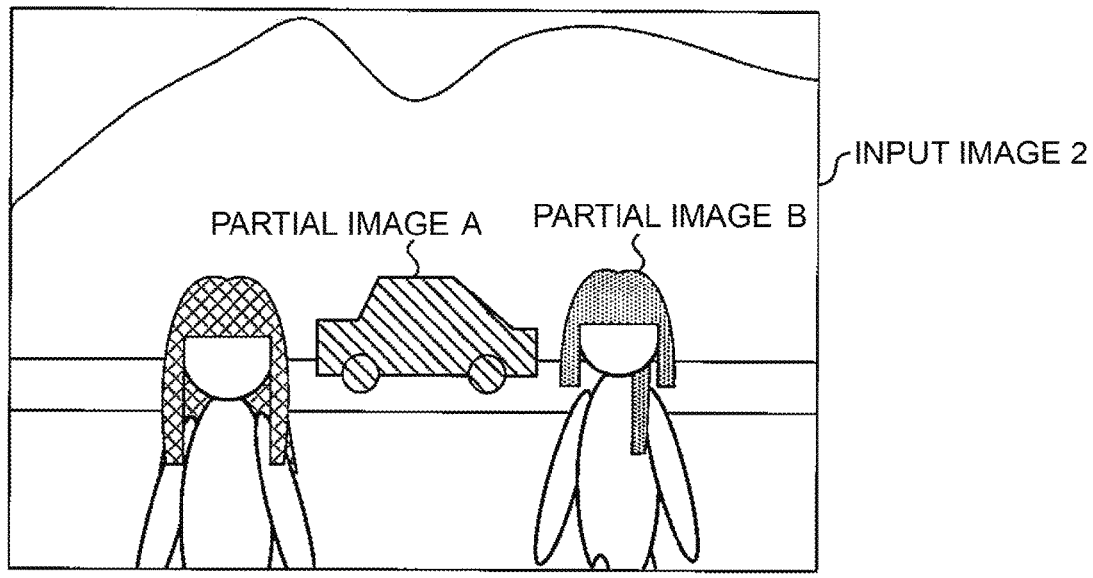
FIG. 12A is an explanatory diagram for explaining embedding of embedded information in an information embedding device of the third exemplary embodiment.
Figure 12B:
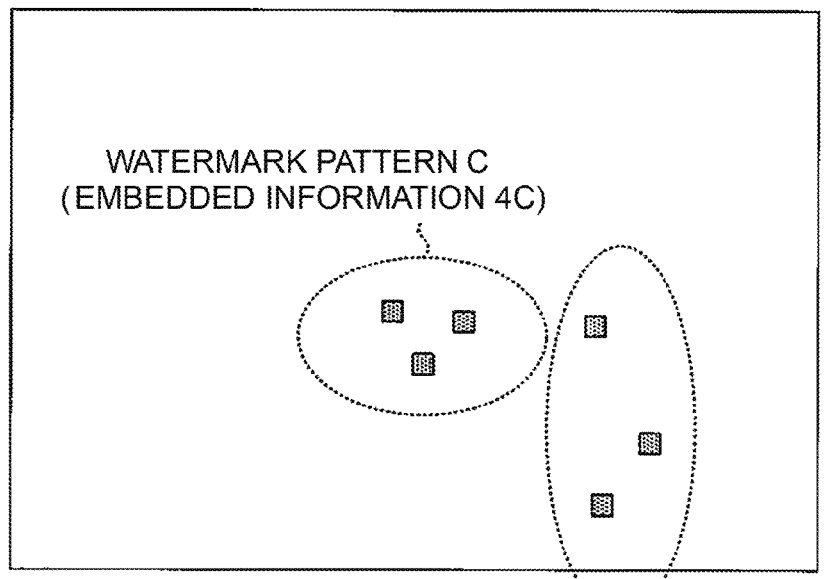
FIG. 12B is an explanatory diagram for explaining embedding of embedded information in an information embedding device of the third exemplary embodiment.

FIG. 12A and FIG. 12B are explanatory diagrams of the embedding of the embedded information 4A, 4B by the information embedding device 10 of the third exemplary embodiment.

In the specific example illustrated by FIG. 12A, a case is illustrated in which a partial image A representing a car and a partial image B representing a person have been extracted as specific images from a single input image 2. Thus, the specific images are not particularly limited. The information embedding device 10 of the third exemplary embodiment embeds embedded information 4C into the partial image A, and embeds embedded information 4D into the partial image B. More specifically, as illustrated in FIG. 12B, the embedded information 4C is embedded by superimposing a watermark pattern C onto the partial image A, and the embedded information 4D is embedded by superimposing a watermark pattern D onto the partial image B. Specific examples of the embedded information 4C corresponding to the partial image A include information related to the car represented by the partial image A. Specific examples of the embedded information 4D corresponding to the partial image B include, for example, information related to the person represented by the partial image B, or information related to an item being worn by that person.

The image analysis section 38 therefore associates a position, inside the input image 2, of the partial image (A, B) obtained by image-analysis of the input image 2, with the respective embedded information 4 (4C, 4D) that corresponds to that partial image, and outputs each partial image (A, B) to the watermark pattern generator 26. For example, correspondence relationships between the type of partial image (such as cars and persons as mentioned above) and corresponding items of embedded information 4 may be pre-stored with regards to what item of embedded information 4 (4C, 4D) is to be embedded into the individual partial images obtained by image-analysis.

When the position of the partial image A and the embedded information 4C have been input from the image analysis section 38, the watermark pattern generator 26 of the third exemplary embodiment generates a watermark pattern C for embedding the embedded information 4C into the partial image A. Moreover, when the position of the partial image B and the embedded information 4D have been input from the image analysis section 38, the watermark pattern generator 26 generates the watermark pattern D for embedding the embedded information 4D into the partial image B. The watermark pattern superimposition section 28 then generates an output image 6 by superimposes the watermark pattern C onto the partial image A of the input image 2 and superimposing the watermark pattern D onto the partial image B and outputs the output image 6.

The information embedding device 10 of the third exemplary embodiment may be implemented by, for example, the computer 40 illustrated in FIG. 13. In the computer 40 illustrated in FIG. 13, the information embedding program 50 stored in the storage section 46 differs from that of the computer 40 explained by the second exemplary embodiment. In contrast to the information embedding program 50 explained by the second exemplary embodiment, the information embedding program 50 of the third exemplary embodiment is provided with an image-analysis process 64 instead of the image splitting process 62.

The CPU 42 operates as the image analysis section 38 by executing the image-analysis process 64. The computer 40, which executes the information embedding program 50, thereby functions as the information embedding device 10 of the third exemplary embodiment.

In the information embedding device 10 of the third exemplary embodiment, partial images are sequentially input from the image analysis section 38, and the information embedding processing executed by the watermark pattern generator 26 is therefore similar to the information embedding processing of the first exemplary embodiment (see FIG. 5). Explanation regarding the information embedding processing is therefore omitted here.

In the third exemplary embodiment, items of embedded information 4 corresponding to individual specific images can be embedded into a single input image 2 by embedding the embedded information 4C, 4D into each specific image (partial image) extracted from a single input image 2.

Explanation has been given in the third exemplary embodiment regarding a mode in which the information embedding device 10 includes the image analysis section 38, and the image analysis section 38 extracts partial images by analyzing the input image 2 and outputs the extracted partial images to the watermark pattern generator 26 together with the embedded information 4 corresponding to the partial images; however, there is no limitation thereto. A device external to the information embedding device 10 may perform image analysis on the input image 2 and may input the partial images to the information embedding device 10 instead of the input image 2.

Fourth Exemplary Embodiment

Although the embedded information 4 is embedded into a predetermined component out of plural color components (for example, R, B) and a brightness component of the image in the first exemplary embodiment to the third exemplary embodiment, there is no limitation to predetermining a component to embed the embedded information 4 into. In the fourth exemplary embodiment, explanation follows regarding a mode in which the embedded information 4 is embedded by selecting color components that are easily embedded into according to the input image 2.

The overall outline of the embedded information processing system 1 (see FIG. 1) is similar to in the first exemplary embodiment, and explanation thereof is therefore omitted.

Figure 14:
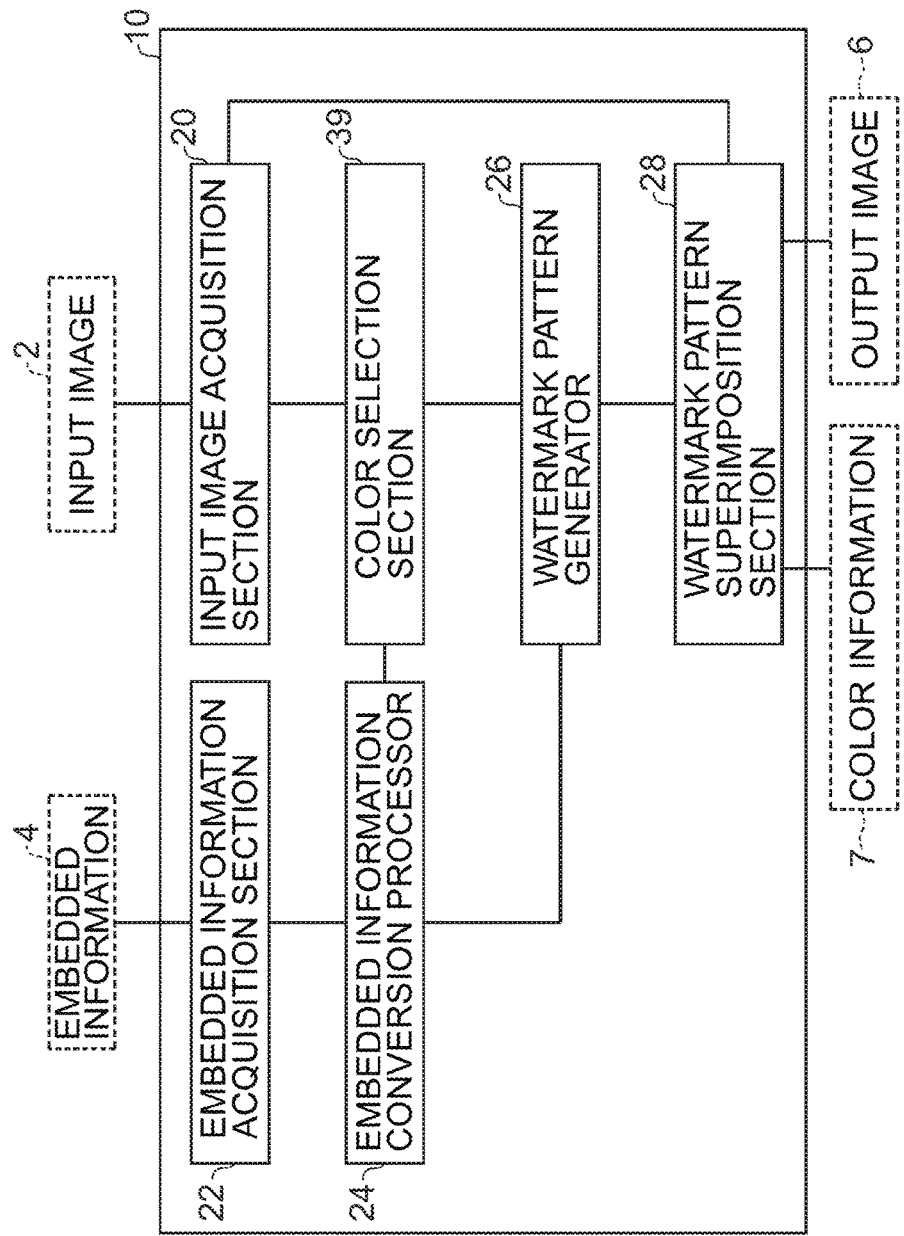
FIG. 14 is a block diagram representing a schematic configuration of an example of an information embedding device according to a fourth exemplary embodiment.

FIG. 14 illustrates an example of a schematic configuration of an information embedding device 10 according to the fourth exemplary embodiment. As illustrated in FIG. 14, in contrast to the information embedding device 10 explained by the first exemplary embodiment, the information embedding device 10 of the fourth exemplary embodiment is further provided with a color selection section 39.

The information embedding device 10 explained by the first exemplary embodiment to the third exemplary embodiment acquires an input image 2 corresponding to one frame of moving picture data, and sequentially performs processing for each frame, for outputting output images 6 with watermark patterns superimposed thereon. Thus, in the first exemplary embodiment to the third exemplary embodiment, input images 2 that correspond to the frames of the moving picture data may be sequentially input with progression of the information embedding processing executed by the watermark pattern generator 26 of the information embedding device 10. However, in the fourth exemplary embodiment, the input image acquisition section 20 acquires plural frames of moving picture data (preferably a specific number of frames or more, or all of the frames) in advance as the input images 2, and outputs the acquired plural frames to the color selection section 39.

The color selection section 39 includes functionality for selecting a color that embeds the embedded information 4, and outputting the selected color to the watermark pattern generator 26, based on the plural input images 2 input from the input image acquisition section 20.

In the fourth exemplary embodiment, information representing the color selected by the color selection section 39 is received as color information 7 (see FIG. 14) by the information detection device 16, either together with the output image 6 or separately. The method by which the information detection device 16 receives the color information 7 is not particular limited, and the color information 7 may, for example, be appended to the header of the output image 6 (the moving picture data). The information detection device 16 detects the embedded information 4 from the output image 6 based on the received color information 7.

Figure 15:
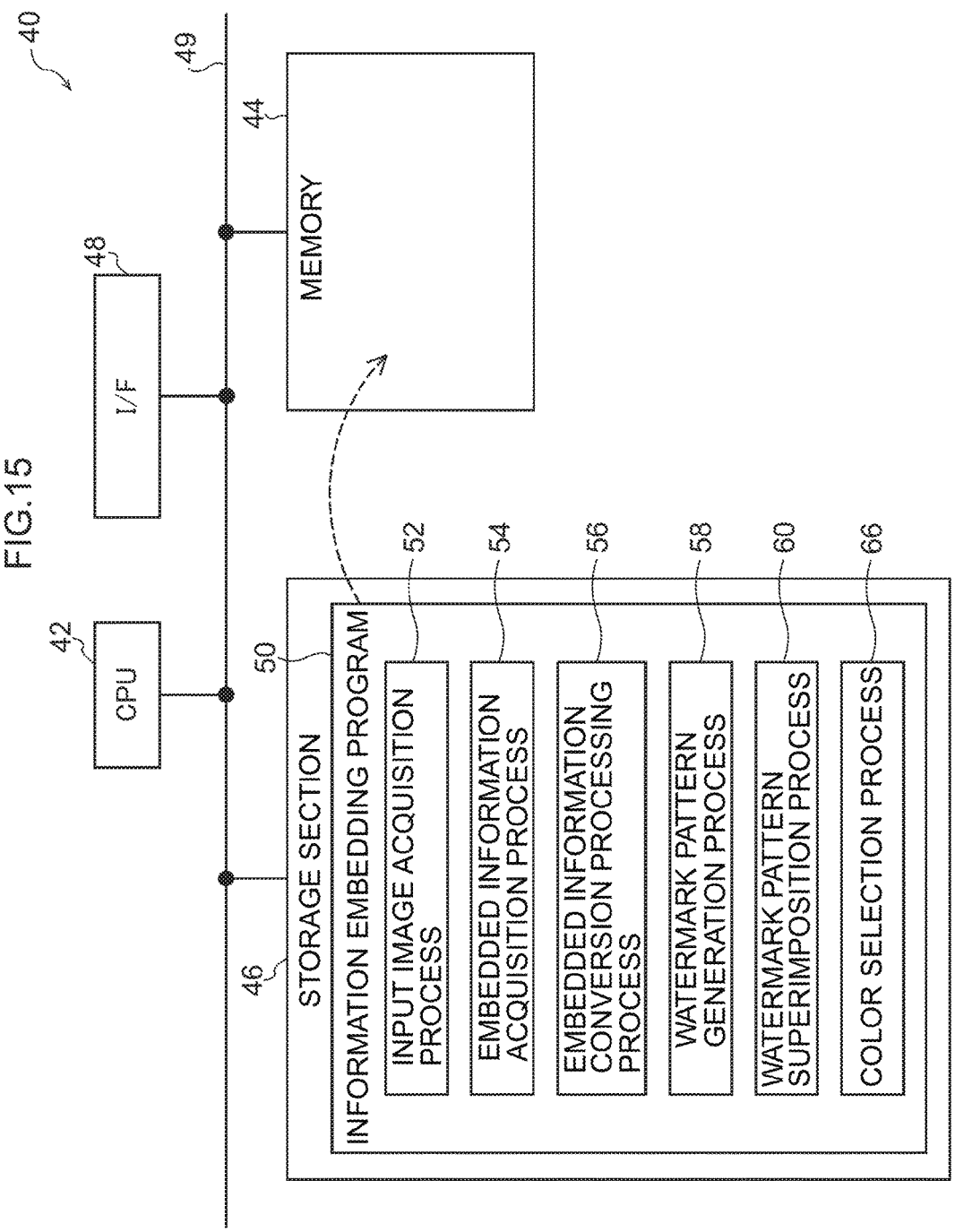
FIG. 15 is a block diagram illustrating a schematic configuration of a computer that functions as an information embedding device according to the fourth exemplary embodiment.

The information embedding device 10 of the fourth exemplary embodiment may, for example, be implemented by the computer 40 illustrated in FIG. 15. In the computer 40 illustrated in FIG. 15, the information embedding program 50 stored in the storage section 46 differs from that of the computer 40 explained by the first exemplary embodiment. The information embedding program 50 of the fourth exemplary embodiment is further provided with a color selection process 66 in addition to each of the processes included in the information embedding program 50 explained by the first exemplary embodiment.

The CPU 42 operates as the color selection section 39 by executing the color selection process 66. The computer 40, which executes the information embedding program 50, thereby functions as the information embedding device 10 of the fourth exemplary embodiment.

Figure 16:
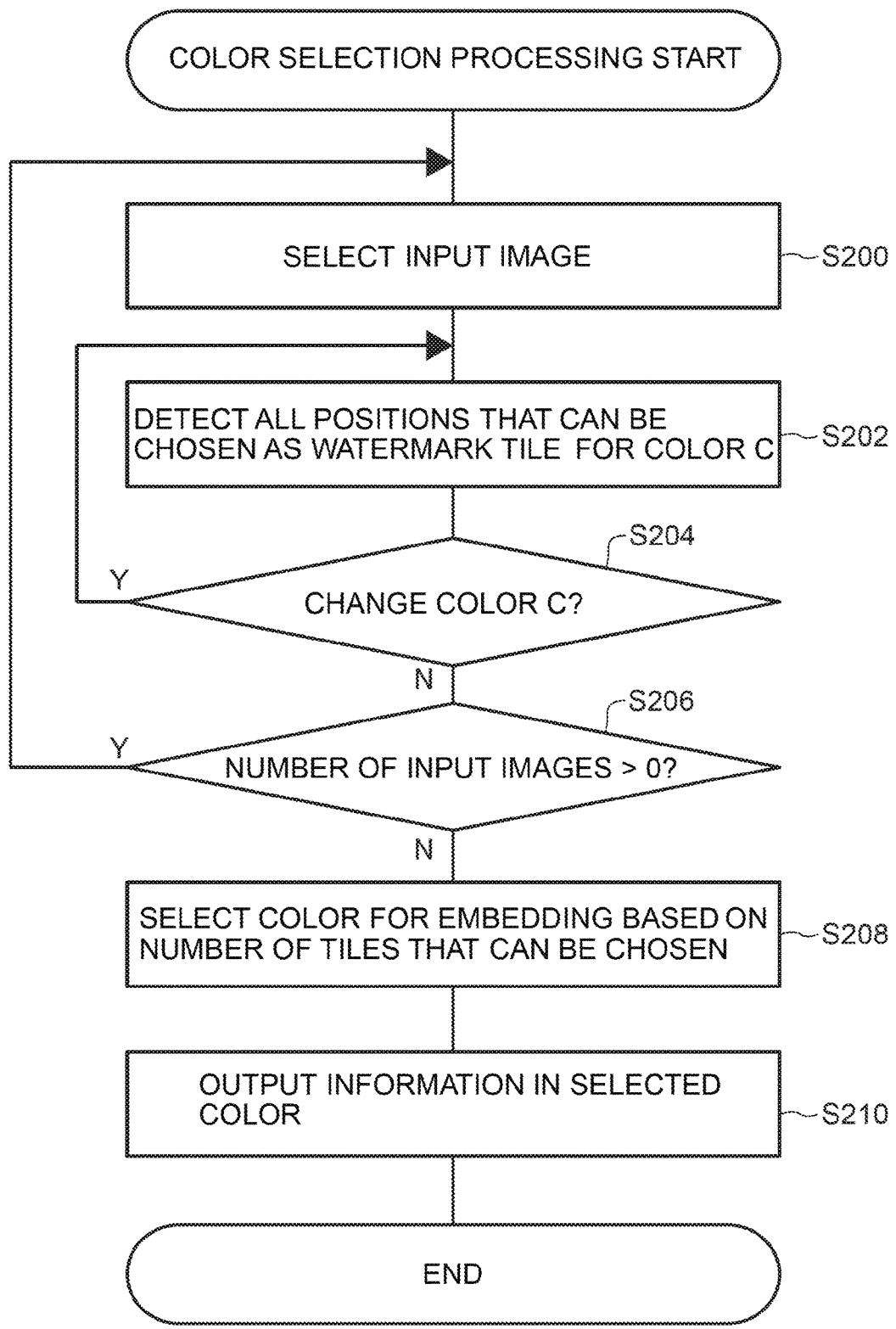
FIG. 16 is an example of a flowchart of color selection processing executed by a color selection section of an information embedding device according to the fourth exemplary embodiment.

Next, explanation follows regarding operation of the color selection section 39 of the information embedding device 10 of the fourth exemplary embodiment. FIG. 16 illustrates an example of the color selection processing executed by the color selection section 39 of the information embedding device 10.

At step S200, the color selection section 39 selects a single input image 2. As described above, plural input images 2 are input from the input image acquisition section 20, and a single input image 2 is therefore selected from out of the input images 2.

At the next step S202, the color selection section 39 detects the number of tiles in the selected input image 2 that can be chosen as watermark tiles for a color C. The color C is a freely selected color, and is a color selected from out of predetermined colors. For example, in cases in which the input image 2 is a color image and the embedded information 4 is to be embedded into any color component of the input image 2 out of red, green, blue, and yellow, the color C is a color selected from out of these color components. It goes without saying that the colors targeted for embedding are not limited to these colors.

The detection method for the number of tiles that can be chosen as watermark tiles at step S202 may be executed by the processing of each step of steps S100 to S112, or of each step out of S100 to step S116, of the information embedding processing explained by the first exemplary embodiment (see FIG. 5). Note that configuration may be made such that changes in the threshold value th used previously in Equation (1) are omitted (detect only tiles with threshold value th=0), or the threshold value th may be changed in steps until reaching a maximum value. Moreover, the threshold value th may be changed in steps, and the processing ended before the maximum value is reached.

At the next step S204, the color selection section 39 determines whether or not to change the color C. In cases in which the processing of step S202 above has not been performed for all target embedding colors as the color C, affirmative determination is made, processing returns to step S202, the color C is changed to a different color, and the processing of step S202 is repeated. However, in cases in which negative determination has been made at step S204, processing transitions to step S206.

At step S206, the color selection section 39 determines whether or not there is an input image 2 still without a detected number of tiles that can be chosen as watermark tiles (number of input images >0). In cases in which there is an input image 2 for which the number of tiles that can be chosen as watermark tiles has not been detected, affirmative determination is made, processing returns to step S200, and the processing of step S200 onward is executed. However, in cases in which the number of tiles that can be chosen as watermark tiles has been detected for all of the input images 2, negative determination is made and processing transitions to step S208.

At step S208, the color selection section 39 selects the color with which to embed the embedded information 4 based on the detected number of tiles that can be chosen as watermark tiles for each color at step S202. In the fourth exemplary embodiment, a shared color (a single color) is selected for the plural input images 2. The method of selecting the color is not particularly limited, and selection may be made based on a predetermined reference. Examples of the predetermined reference include ranking the colors according to the number of tiles that can be chosen as watermark tiles in each of the input images 2, and selecting a color that was given a high rank a large number of times. For example, the color for which the number of tiles that can be chosen as watermark tiles was the highest overall may be selected.

The information embedding processing executed by the watermark pattern generator 26 is similar to the information embedding processing of the first exemplary embodiment (see FIG. 5). Explanation regarding the information embedding processing is therefore omitted here.

For example, selecting the color for which the number of tiles that can be chosen is high, as described above, can increase the probability of selecting a color for which a great number of tiles that satisfy Equation (1) at a stage at which the value of the threshold value th of Equation (1) is at a comparatively low value can be chosen from amongst the tiles. Accordingly, the embedded information 4 can be better made unnoticeable as noise, and image quality degradation can be suppressed.

As explained above, in the information embedding device 10 of each of the exemplary embodiments above, the embedded information conversion processor 24 converts the embedded information 4 into a watermark pixel value W and a number of watermark pixel values W. The watermark pattern generator 26 chooses watermark embedding positions, and sets a watermark pattern, based on the input image 2. From the input image 2, the watermark pattern generator 26 detects, as a watermark embedding position, a pixel block having a pixel value that, after being changed by the watermark pixel value W, would be within a first specific range of the average value of the pixel values of a surrounding pixel block (tile). The watermark pattern superimposition section 28 changes, by watermark pixel value W, the pixel value of a pixel block that accords with the watermark pattern set by the watermark pattern generator 26. More specifically, the watermark pattern superimposition section 28 generates the output image 6 by superimposing the watermark pattern generated by the watermark pattern generator 26 onto the input image 2, and outputs the output image 6.

Thus, in the information embedding device 10 of each of the exemplary embodiments described above, pixel blocks (tiles) having a high probability of being noise originally present in the input image 2 are detected as watermark embedding positions. This enables noise reduction to be achieved by cancelling out noise originally present in the input image 2 with noise caused by embedding the watermark pattern 8, thereby enabling degradation of the image quality of the input image 2 to be suppressed.

Although the positions of watermark tiles relative to one another are not stipulated for embedding the information 4 in each of the exemplary embodiments above, relative positions may be stipulated for the watermark tiles. For example, in cases in which plural watermark embedding positions are chosen from the input image 2, it is preferable to stipulate such that watermark tiles are not present adjacent to each other (concentrated into a small region). For example, tiles within a specific range of a position already chosen as a watermark embedding position are preferably not chosen as watermark tiles. For example, when the input image 2 is split into regions according to the number of watermark tiles, a single watermark embedding position may be chosen for each of the split regions.

Although explanation has been given in each of the exemplary embodiments above regarding cases in which the size of the watermark tile is one pixel, the size of the watermark tile is not particularly limited. For example, in cases in which the size of the watermark tile is 2×2=4 pixels, inspection target tiles in the information embedding processing may also be 4 pixels such that the average value of the pixel values of the four pixels are treated as the pixel value P of the inspection target tile.

Moreover, the size of the tile may be used instead of the threshold value th in the information embedding processing explained by the first exemplary embodiment (see FIG. 5). In such cases, since it is possible that more positions can be detected as watermark tiles that can be chosen when the watermark tiles have a small size than when the watermark tiles have a large size, for example, a maximum value for the number of tiles may be determined in advance, and the processing of steps S100 to S116 of the information embedding processing may be performed repeatedly while gradually increasing the number of tiles from one up to a maximum value (while decreasing the size of the tiles).

Moreover, although explanation has been given in each of the exemplary embodiments above regarding cases in which the embedded information 4 is embedded by adding the watermark pixel value W to the pixel values of any color component of the input image 2 out of, for example, R, B, the target for embedding the embedded information 4 is not limited thereto. The pixel values of technology disclosed herein may, for example, be brightness value, hue, color saturation, or the like, and the information embedding processing may be applied using at least one out of these to generate a watermark pattern.

Although explanation has been given in each of the exemplary embodiments above regarding modes in which images of respective frames of a moving picture data serve as the input images 2, the input images 2 are not limited thereto, and may be still images. It goes without saying that in such cases also, image quality degradation can be suppressed by embedding the embedded information 4 into the input image 2 (superimposing the watermark pattern thereon).

Although explanation has been given in each of the exemplary embodiments above regarding cases in which the output image 6 is directly input to the information detection device 16 from the information embedding device 10, the method of inputting the output image 6 into the information detection device 16 is not particularly limited.

Figure 17:
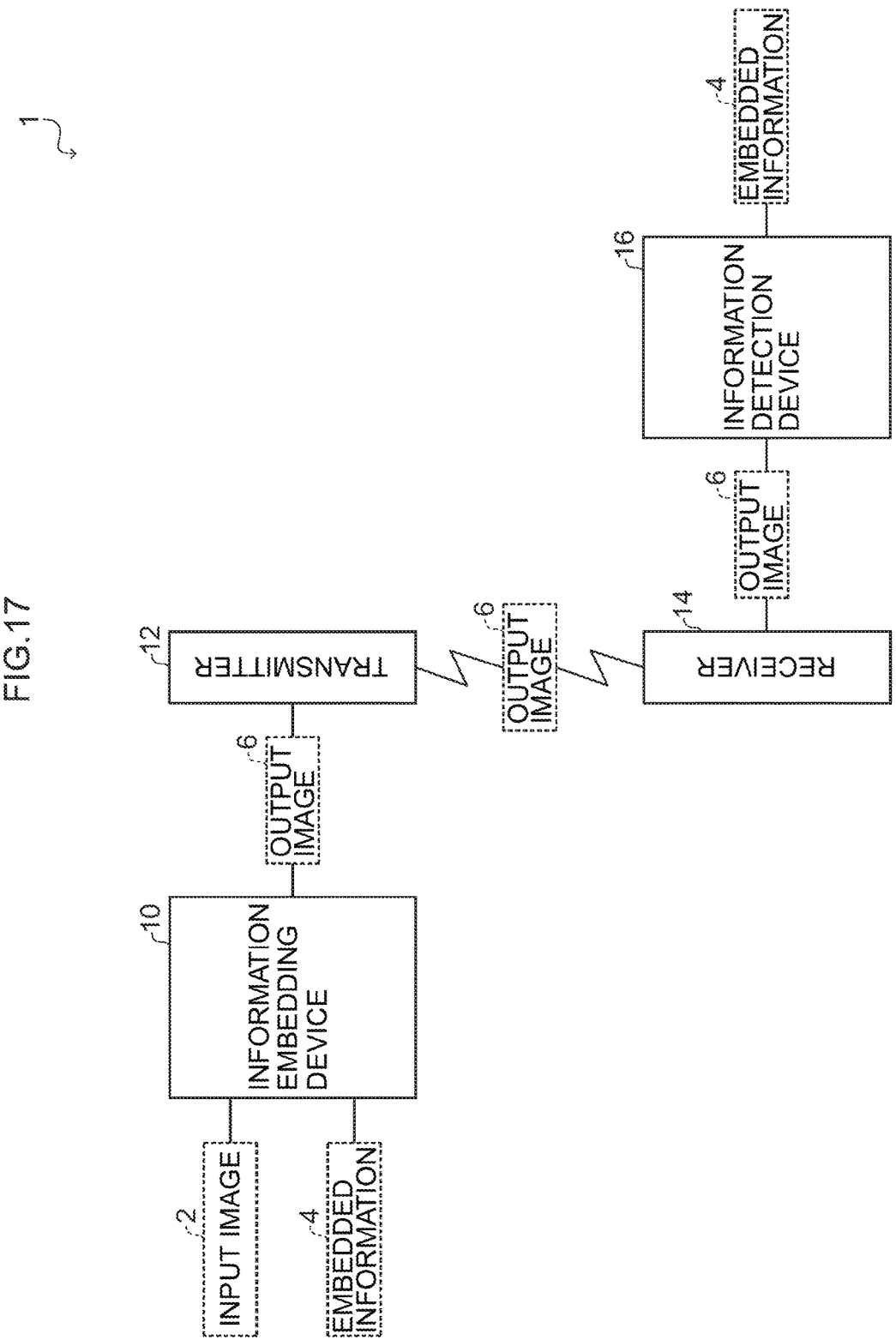
FIG. 17 is a schematic diagram representing a configuration of another example of an embedded information processing system.

For example, a transmitter 12 and a receiver 14 may be provided like in the information processing system 1 illustrated in FIG. 17, and the output image 6 may be input to the information detection device 16 via the transmitter 12 and the receiver 14. In such cases, the information detection device 16 detects the embedded information 4 from the output image 6 received by the receiver 14, and outputs the detected embedded information 4.

The transmitter 12 illustrated in FIG. 17 includes functionality for transmitting the output image 6 that has been output from the information embedding device 10, and is what is known as a general broadcasting device or a distribution device. The receiver 14 is not particularly limited as long as the receiver 14 includes functionality for receiving the output image 6 from the transmitter 12. In the embedded information processing system 1 illustrated in FIG. 17, the method for transmitting (distributing) the output image 6, which is a moving picture, from the transmitter 12 to the receiver 14 is not particularly limited. Examples of the transmission method include wired broadcasting, wireless broadcasting, and television broadcasting.

Explanation has been above regarding a state in which the information embedding program 50 is pre-stored (installed) in the storage section 46 of the computer 40. However, the information embedding program 50 may be provided in a mode recorded on a recording medium. Examples of the recording medium include compact disc read only memory (CD-ROMs), digital versatile disk read only memory (DVD-ROMs), and universal series bus (USB) memory.

The first technology and the second technology make image quality degradation resulting from embedding information in the image less noticeable. However, in practice image quality degradation is sometimes not sufficiently suppressed since the average color or the like of the image overall changes greatly as the information is embedded into the image.

An object of one aspect of the present invention is to suppress image quality degradation caused by embedding information into an image.

One aspect of technology disclosed herein exhibits the advantageous effect of enabling image quality degradation to be suppressed by embedding information into an image.

All publications, patent applications, and technical standards mentioned in the present specification are incorporated by reference in the present specification to the same extent as if the individual publication, patent application, or technical standard was specifically and individually indicated to be incorporated by reference.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information embedding device, comprising:
a memory; and
a processor configured to execute a procedure, the procedure including:
acquiring an image including a plurality of pixel blocks from the memory;
from the plurality of pixel blocks, determining a position of a pixel block having a value that, after being changed by a specific value corresponding to information to be embedded into the image, will be within a first specific range of an average of values of surrounding pixels within the pixel block as a position of an embedding target pixel block, while distinguishing a position of a pixel block that is not determined to be the embedding target pixel block as a position of a non-embedding target pixel block, to thereby suppress image quality degradation due to embedding information into the image according to the determined positions of the embedding target pixel block and the non-embedding target pixel block; and
changing the value of the embedding target pixel within the embedding target pixel block by the specific value corresponding to the information to be embedded into the image.

2. The information embedding device of claim 1, wherein a pixel block having a pixel with a value whose difference from an average of values of surrounding pixels has a sign that is opposite to a sign of the specific value, is determined as the embedding target pixel block.

3. The information embedding device of claim 1, wherein a pixel block having a value that differs from the average is determined as the embedding target pixel block.

4. The information embedding device of claim 1, wherein, in cases in which a number of pixel blocks whose value is to be changed in order to embed the information into the image is greater than a number of pixel blocks in which a value of the embedding target pixel, after being changed by the specific value, is within the first specific range of the average, a pixel block, in which the value of the embedding target pixel, after being changed by the specific value, is within a second specific range that is wider than the first specific range of the average, is determined as the embedding target pixel block.

5. The information embedding device of claim 1, wherein:
the image is split into a plurality of split images; and
the embedding target pixel block is determined for each of the split images.

6. The information embedding device of claim 1, wherein:
the determining the position of a pixel block as a position of the embedding target pixel block is respectively performed for two or more components among a plurality of color components and a brightness component; and
a value, of a selected component of the embedding target pixel block corresponding to an information embedding target component selected from the two or more components for which the embedding target pixel block was determined, is changed.

7. An information embedding method, comprising, by a processor:
acquiring an image including a plurality of pixel blocks from a memory;
from the plurality of pixel blocks, determining a position of a pixel block having a value that, after being changed by a specific value corresponding to information to be embedded into the image, will be within a first specific range of an average of values of surrounding pixels within the pixel block as a position of an embedding target pixel block, while distinguishing a position of a pixel block that is not determined to be the embedding target pixel block as a position of a non-embedding target pixel block, to thereby suppress image quality degradation due to embedding information into the image according to the determined positions of the embedding target pixel block and the non-embedding target pixel block; and
changing the value of the embedding target pixel within the embedding target pixel block by the specific value corresponding to the information to be embedded into the image.

8. The information embedding method of claim 7, wherein a pixel block having a pixel with a value whose difference from an average of values of surrounding pixels has a sign that is opposite to a sign of the specific value, is determined as the embedding target pixel block.

9. The information embedding method of claim 7, wherein a pixel block having a value that differs from the average is determined as the embedding target pixel block.

10. The information embedding method of claim 7, wherein, in cases in which a number of pixel blocks in which a value is to be changed in order to embed the information into the image is greater than a number of pixel blocks in which a value of the embedding target pixel, after being changed by the specific value, is within the first specific range of the average value, a pixel block in which the value of the embedding target pixel, after being changed by the specific value, is within a second specific range that is wider than the first specific range of the average value is determined as the embedding target pixel block.

11. The information embedding method of claim 7, wherein:
the image is split into a plurality of split images; and
the embedding target pixel block is determined for each of the split images.

12. The information embedding method of claim 7, wherein:
the determining the position of a pixel block as a position of the embedding target pixel block is respectively performed for two or more components among a plurality of color components and a brightness component, and
a value, of a selected component of the embedding target pixel block corresponding to an information embedding target component selected from the two or more components for which the embedding target pixel block was determined, is changed.

13. A non-transitory recording medium storing a program that causes a computer to execute a process, the process comprising:
acquiring an image including a plurality of pixel blocks from a memory;
from the plurality of pixel blocks, determining a position of a pixel block having a value that, after being changed by a specific value corresponding to information to be embedded into the image, will be within a first specific range of an average of values of surrounding pixels within the pixel block as a position of an embedding target pixel block, while distinguishing a position of a pixel block that is not determined to be the embedding target pixel block as a position of a non-embedding target pixel block, to thereby suppress image quality degradation due to embedding information into the image according to the determined positions of the embedding target pixel block and the non-embedding target pixel block; and
changing the value of the embedding target pixel within the embedding target pixel block by the specific value corresponding to the information to be embedded into the image.

14. The recording medium of claim 13, wherein a pixel block including a pixel with a value whose a difference from an average of values of surrounding pixels has a sign that is opposite to a sign of the specific value, is determined as the embedding target pixel block.

15. The recording medium of claim 13, wherein a pixel block having a value that differs from the average value is determined as the embedding target pixel block.

16. The recording medium of claim 13, wherein, in cases in which a number of pixel blocks whose value is to be changed in order to embed the information into the image is greater than a number of pixel blocks in which a value of the embedding target pixel, after being changed by the specific value, is within the first specific range of the average value, a pixel block in which the value of the embedding target pixel, after being changed by the specific value, is within a second specific range that is wider than the first specific range of the average is determined as the embedding target pixel block.

17. The recording medium of claim 13, wherein:
the image is split into a plurality of split images; and
the embedding target pixel block is determined for each of the split images.

18. The recording medium of claim 13, wherein:
the determining the position of a pixel block as a position of the embedding target pixel block is respectively performed for two or more components among a plurality of color components and a brightness component, and
a value, of a selected component of the embedding target pixel block corresponding to an information embedding target component selected from the two or more components for which the embedding target pixel block was determined, is changed.

* * * * *